United States Patent
Troutman

(10) Patent No.: US 10,271,411 B2
(45) Date of Patent: Apr. 23, 2019

(54) LIGHT EMITTING DIODE FAILURE DETECTION SYSTEM FOR A VEHICLE WITH PRE-TRIP INSPECTION

(71) Applicant: Truck-Lite Co., LLC, Falconer, NY (US)

(72) Inventor: Scott Troutman, Falconer, NY (US)

(73) Assignee: Truck-Lite Co., LLC, Falconer, NY (US)

( * ) Notice: Subject to any disclaimer, the term of this patent is extended or adjusted under 35 U.S.C. 154(b) by 0 days.

(21) Appl. No.: 15/442,642

(22) Filed: Feb. 25, 2017

(65) Prior Publication Data
US 2017/0171952 A1    Jun. 15, 2017

Related U.S. Application Data

(63) Continuation-in-part of application No. 14/855,842, filed on Sep. 16, 2015, now Pat. No. 10,065,563.

(51) Int. Cl.
| | |
|---|---|
| G01R 31/02 | (2006.01) |
| G01R 31/27 | (2006.01) |
| H05B 37/02 | (2006.01) |
| G08G 1/00 | (2006.01) |
| H05B 37/03 | (2006.01) |
| H05B 33/08 | (2006.01) |
| B60Q 11/00 | (2006.01) |
| H04B 7/24 | (2006.01) |

(52) U.S. Cl.
CPC ........... H05B 37/03 (2013.01); B60Q 11/005 (2013.01); H05B 33/089 (2013.01); H04B 7/24 (2013.01)

(58) Field of Classification Search
CPC ........ G01R 31/02; G01R 31/27; G01R 31/31; B60Q 11/00; H05B 37/02; H05B 37/03; H03B 33/08; G08G 1/00; G08G 1/13
See application file for complete search history.

(56) References Cited

U.S. PATENT DOCUMENTS

| | | |
|---|---|---|
| 4,745,339 A | 5/1988 | Izawa |
| 6,218,952 B1 | 4/2001 | Borland et al. |
| 6,392,364 B1 | 5/2002 | Yamamoto et al. |
| 6,490,512 B1 | 12/2002 | Niggemann |
| 6,674,288 B2 | 1/2004 | Gumbel et al. |
| 6,788,195 B1 | 9/2004 | Stegman et al. |
| 7,042,165 B2 | 5/2006 | Madhani et al. |
| 7,046,132 B2 | 5/2006 | Carpenter |
| 7,429,917 B2 | 9/2008 | Fredericks et al. |
| 7,430,464 B2 | 9/2008 | Bell et al. |
| 7,528,553 B2 | 5/2009 | Ito et al. |
| 7,876,103 B2 | 1/2011 | Mihai et al. |

(Continued)

FOREIGN PATENT DOCUMENTS

| | | |
|---|---|---|
| EP | 1744602 A2 | 1/2007 |
| EP | 1830607 A1 | 5/2007 |

(Continued)

*Primary Examiner* — Neel D Shah
(74) *Attorney, Agent, or Firm* — The Bilicki Law Firm, PC

(57) ABSTRACT

A light failure detection system with pre-trip inspection for use in a vehicle having a plurality of light emitting diode lighting devices includes a plurality of voltage level monitoring circuits and plurality of current monitoring circuits for measuring the voltage and current draw of a plurality of lighting circuits. The system includes a pre-trip inspection mode for sequentially activating a plurality of lighting circuits and allowing inspection of the plurality of light emitting diode lighting devices.

25 Claims, 39 Drawing Sheets

(56) References Cited

U.S. PATENT DOCUMENTS

| | | | |
|---|---|---|---|
| 7,904,260 | B2 | 3/2011 | Burlak et al. |
| 8,334,662 | B2 | 12/2012 | Jin et al. |
| 8,471,498 | B2 | 6/2013 | Aboulnaga |
| 8,633,813 | B2 | 1/2014 | Shank et al. |
| 8,635,035 | B2 | 1/2014 | De Otto |
| 8,653,539 | B2 | 2/2014 | Tischler et al. |
| 8,749,142 | B2 | 6/2014 | Nguyen et al. |
| 8,816,697 | B2 | 8/2014 | Miller et al. |
| 8,964,431 | B2 | 2/2015 | Sato et al. |
| 9,073,446 | B2 | 7/2015 | Brown et al. |
| 9,103,521 | B2 | 8/2015 | Nishitani et al. |
| 9,434,308 | B2 | 9/2016 | Bean |
| 2006/0139942 | A1 | 6/2006 | Pond et al. |
| 2007/0108843 | A1 | 5/2007 | Preston et al. |
| 2011/0169447 | A1 | 7/2011 | Brown et al. |
| 2011/0193484 | A1 | 8/2011 | Harbers et al. |
| 2012/0161633 | A1 | 6/2012 | Nishitani et al. |
| 2012/0218790 | A1 | 6/2012 | Sato et al. |

FOREIGN PATENT DOCUMENTS

| | | |
|---|---|---|
| GB | 2511095 A | 8/2014 |
| WO | WO 2012077013 A3 | 8/2012 |

← LIGHTS ALL                                                                                                   Q Customer ID ▽ Andy King ▷

| TRAILER ID | GROUP | DATE/TIME | LOCATION | BATTERY LEVEL | POWER SOURCE | SENSORS | VALUE |
|---|---|---|---|---|---|---|---|
| 57594 | 1224376417 | 01-28-2017 18:38:59 | 1834 W McEwen Dr, Franklin, TN 37067, USA | | Solar | LODS | Red: Stop |
| 53588 | 1720278577 | 01-23-2017 03:28:32 | 3076-3098 320th St, Lohrville, LA 51453, USA | | Battery | LODS | Black: M/C |
| 59378 | 8548164796 | 01-19-2017 05:51:38 | 318 Seaboard Ln, Franklin, TN 37067, USA | | Solar | LODS | Green: RH Turn |
| 57328 | 6177569219 | 01-16-2017 14:35:51 | US-95, Las Vegas, NV 89124, USA | | Solar | LODS | Red: Stop |
| 57710 | 7855597928 | 01-10-2017 02:56:52 | 5203 Illinois Ave, Nashville, TN 37209, USA | | Battery | LODS | Red: Stop |
| — | | | | | | | |
| 53394 | 2945743156 | 01-10-2017 02:05:54 | 811 Industrial Ave, Chesapeake, VA 23324, USA | | Battery | LODS | Black: M/C |
| 57594 | 1224376417 | 01-23-2017 13:38:59 | 1834 W McEwen Dr, Franklin, TN 37067, USA | | Solar | LODS | Red: Stop |

FIRST | PREVIOUS | 1 | NEXT | LAST

*FIG. 14C*

LIGHT EMITTING DIODE FAILURE DETECTION SYSTEM FOR A VEHICLE WITH PRE-TRIP INSPECTION

FIELD OF THE INVENTION

The present application is directed to a method and system for detecting failure of a lighting device with a pre-trip inspection mode in a vehicle having a marker or tail lamp, a stop lamp, a left turn signal and a right turn signal.

BRIEF DESCRIPTION OF THE DRAWINGS

FIGS. 14A-14C are screen shots from a user interface.

BRIEF SUMMARY

Figure 1:
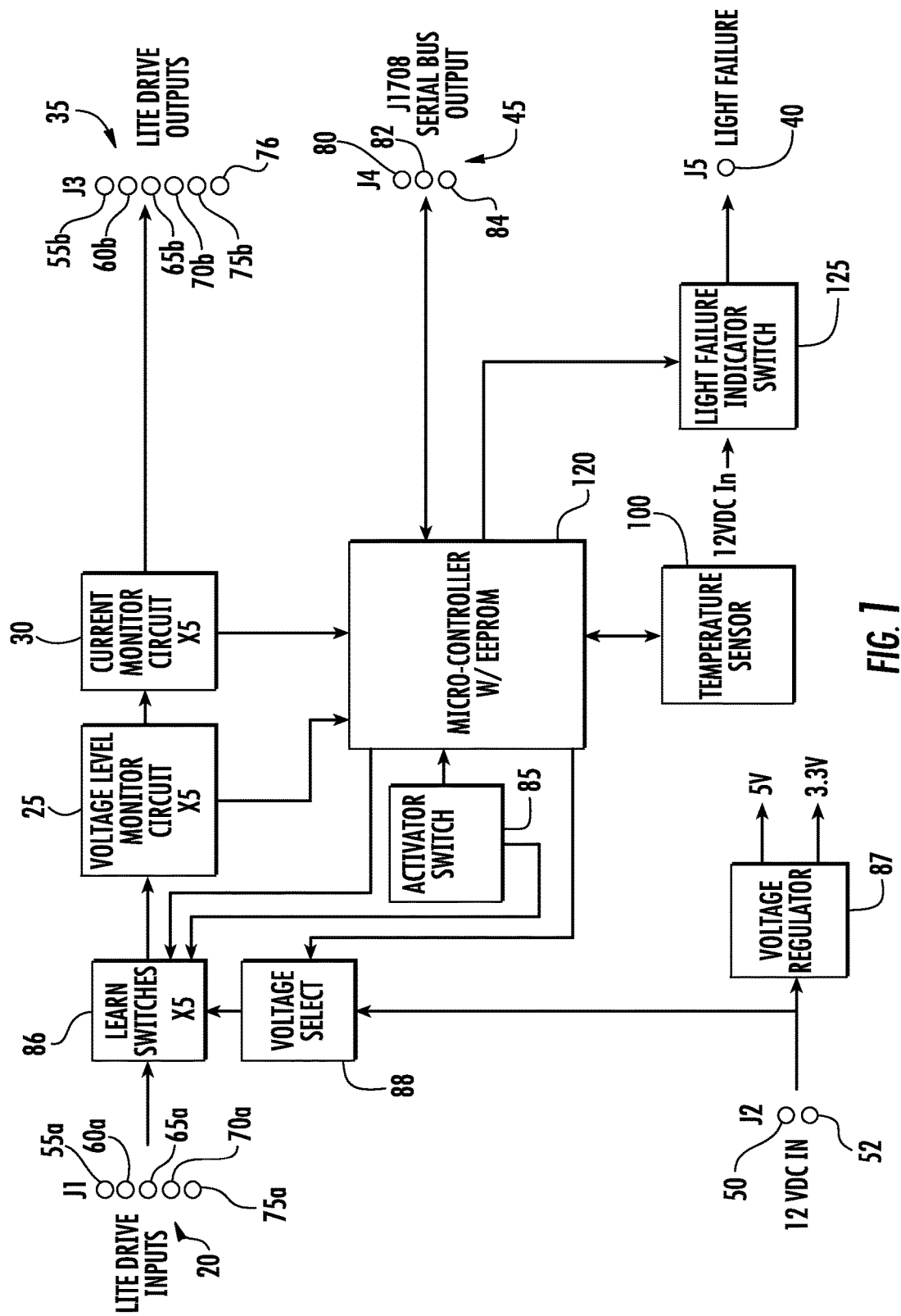
FIG. 1 is a block diagram of a light failure detection system with pre-trip inspection.

A light failure detection system with pre-trip inspection for use in a vehicle having a plurality of light emitting diode lighting devices includes a circuit board and a plurality of lighting circuits being coupled to the circuit board by an input wire. The system includes a pre-trip inspection mode for sequentially activating a plurality of lighting circuits and allowing inspection of the plurality of light emitting diode lighting devices. The system further includes a plurality of voltage level monitoring circuits on the circuit board, each one of the plurality of voltage level monitoring circuits connected to one of the lighting circuits and adapted to measure the voltage of the one of the light circuits. A plurality of current monitoring circuits is also provided on the circuit board, each one of the plurality of current monitoring circuits connected to one of the lighting circuits and being adapted to measure a current draw of the respective light circuit. A voltage drop circuit enables the plurality of voltage level monitoring circuits and the plurality of current monitoring circuits to measure current and voltage at an adjusted input voltage.

The system includes learn mode switch for placing the light failure detection system into a learn mode for monitoring the lighting circuits with the plurality of voltage level monitoring circuits and the plurality of current monitoring circuits to determine threshold voltage and current levels for the lighting circuits. A microcontroller is coupled to the circuit board for storing the threshold voltage and current levels and a temperature sensed by a temperature sensor. The microcontroller is adapted to calculate an adjusted threshold current based on a voltage sensitivity and the sensed temperature. A fault indicator is also included for indicating a status of the light failure detection system when a measured current is above or below the adjusted threshold current by a predetermined value.

In addition, a method of detecting a failure of a light emitting diode lighting device in a vehicle having a failure detection system is disclosed. The method includes activating a learn mode, measuring a current (c_ref) and a voltage (v_ref) of a plurality of lighting circuits at an input voltage, measuring a system temperature (t_ref) and deactivating the learn mode. The method also includes measuring at least one light drive input current (c_now) and voltage (v_now) in a normal mode, measuring the system temperature in a normal mode and calculating an adjusted threshold current value based on voltage sensitivity and system temperature (t_ref). It is then determined if the measured light drive input current is below or above the adjusted threshold current value by a predetermined value and displaying an indication of light failure if the measured current is below or above the adjusted threshold current value by the predetermined value.

The Light failure detection system 10 detects failure of 12V lamps in a vehicle lighting system. In particular, light failure detection system 10 detects the voltage level and current flow in various lighting circuits. The detection of low or high current draw indicates the loss of lamp functionality. This lamp loss is indicated to the operator via an indicator output that can be used to drive an LED or other type of indicator.

DETAILED DESCRIPTION OF THE INVENTION

In general, a light failure detection system 10 utilizes microprocessor technology for monitoring LED safety lighting elements on trailers. System 10 monitors lights in real time, thereby protecting against violations and downtime. System 10 is installed on a trailer as part of a SAE J560 nose box assembly and is integrated into the trailer electrical system. A pre-trip inspection mode is provided for allowing a driver to perform a routine light check without assistance. During the pre-trip inspection, trailer lights will turn on and cycle through various circuits for thirty seconds each to allow the driver to confirm that all lights are functioning properly, or to be alerted that a repair is needed. Thus, roadside service calls and out-of-service violations are minimized.

System 10 also provides on-the-road awareness of a trailer's safety lighting by monitoring all of the trailer's LED safety lighting and wiring in real-time. An indicator light mounted on the front roadside corner of the trailer alerts the driver of a fault condition. The driver can easily locate the fault by toggling the switch on the system, which causes the indicator light to blink a coded sequence that is assigned to the problematic light circuit.

FIG. 1 is a block diagram of a light failure detection system that accepts five (5) Lite Drive Inputs 20, five voltage monitor circuits 25, five current monitor circuits 30 and five light drive output ports 35. The voltage and current levels on each lighting circuit are monitored and used to make a "Light failure" determination for each of five lighting circuits. The Light failure detection is indicated to the operator using the Light failure signal or output 40. In some embodiments, a J1708 serial bus output 45 may be used.

The power input for Light failure system 10 will use 12 VDC power supplied by the vehicle to power the Light failure detection electronics. This 12 VDC bus voltage will be supplied to the onboard power regulators which will provide the regulated voltage needed by the system electronics. Plated PCB holes will allow attachment of pigtail wires that will make connection to the 12 VDC vehicle power source. Two wires, indicated at 50 and 52, will be provided for these inputs: 12 VDC Vehicle Power: Blue Wire 50; and Vehicle Ground: White Wire 52. The operating range of the input voltage range is typically between about 11.5V to 14.4V. The Light failure detection will require about 200 mA from the 12V bus to power all of the Light failure system circuitry.

The Light failure system includes five lighting circuits having discrete wire "Light Drive" inputs 20. The wires are typically 12 GA wires that are capable of handling 15 Amps. Plated printed circuit board (PCB) holes will allow attachment of the pigtail wires for the vehicle lighting circuit inputs. Terminals on the wires may be used to connect the wires to the PCB. In the embodiment shown, the lighting circuits include Light Drive inputs: Light Circuit 1 Input: Red Wire (Stop) 55a, Light Circuit 2 Input: Black Wire (Marker-Running) 60a, Light Circuit 3 Input: Brown Wire (Clearance-Running) 65a, Light Circuit 4 Input: Yellow Wire (Left Turn) 70a, and Light Circuit 5 Input: Green Wire (Right Turn) 75a. These inputs are referenced to the Vehicle Ground wire (White Wire) 52.

The lighting circuits also include five discrete wire outputs 35. Plated PCB holes will allow attachment of pigtail wires that will make connection to the vehicle lighting circuit outputs. Five PCB holes accommodate the drive outputs for the vehicle lighting circuits. These circuits are typically capable of handling 15 Amps per circuit. These output connections are fed from the Lite Drive Inputs 20. The lighting circuit outputs are: Light Circuit 1 Output: Red Wire (Stop) 55b, Light Circuit 2 Output: Black Wire (Marker-Running) 60b, Light Circuit 3 Output: Brown Wire (Clearance-Running) 65b, Light Circuit 4 Output: Yellow Wire (Left Turn) 70b, Light Circuit 5 Output: Green Wire (Right Turn) 75b, and Vehicle Ground Output: White Wire 76. Alternatively, ground may be picked up via a jumper wire outside the module.

Figure 2A:
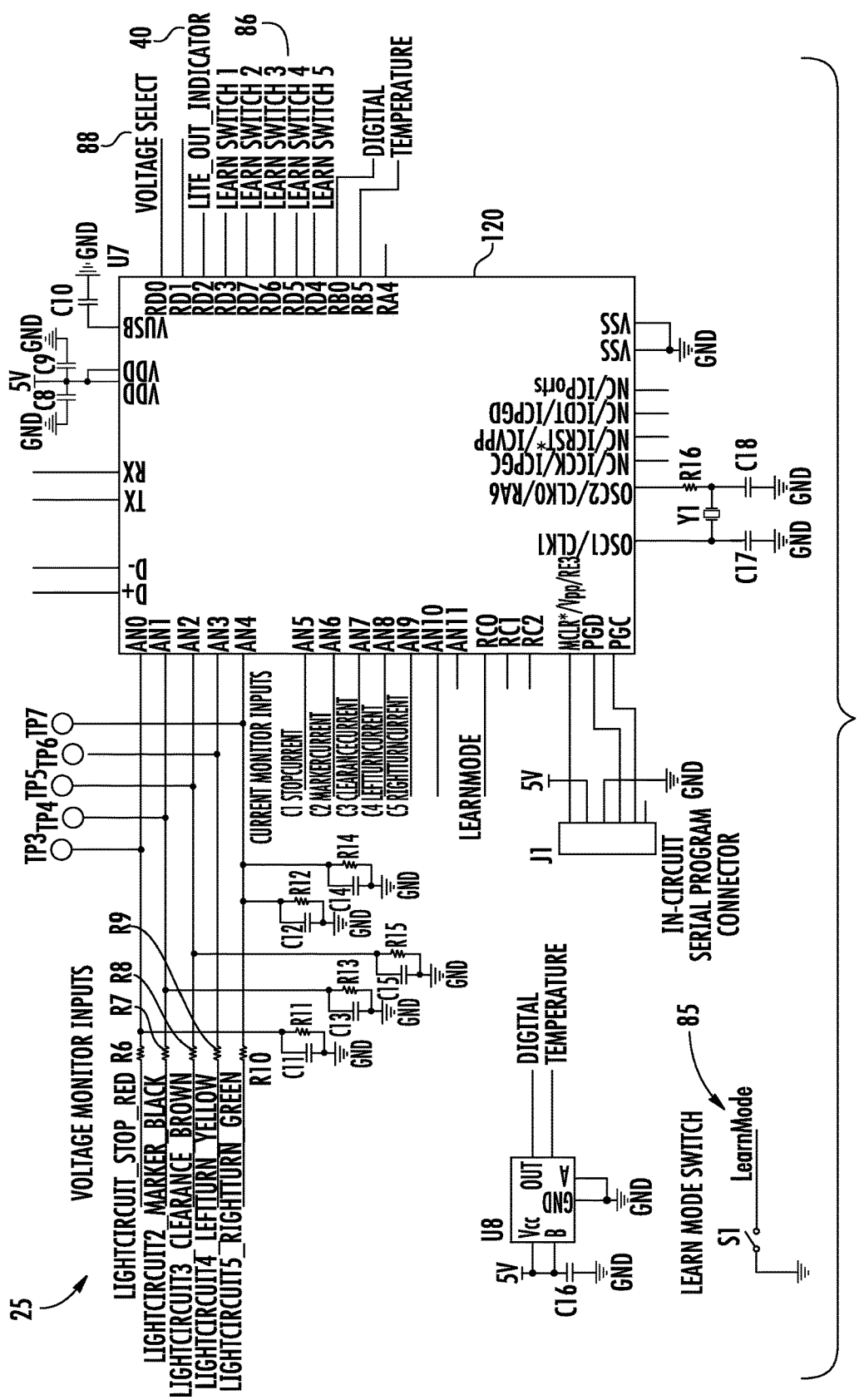
FIG. 2A-2C are circuit diagrams of the light failure detection system with pre-trip inspection.
Figure 2B:
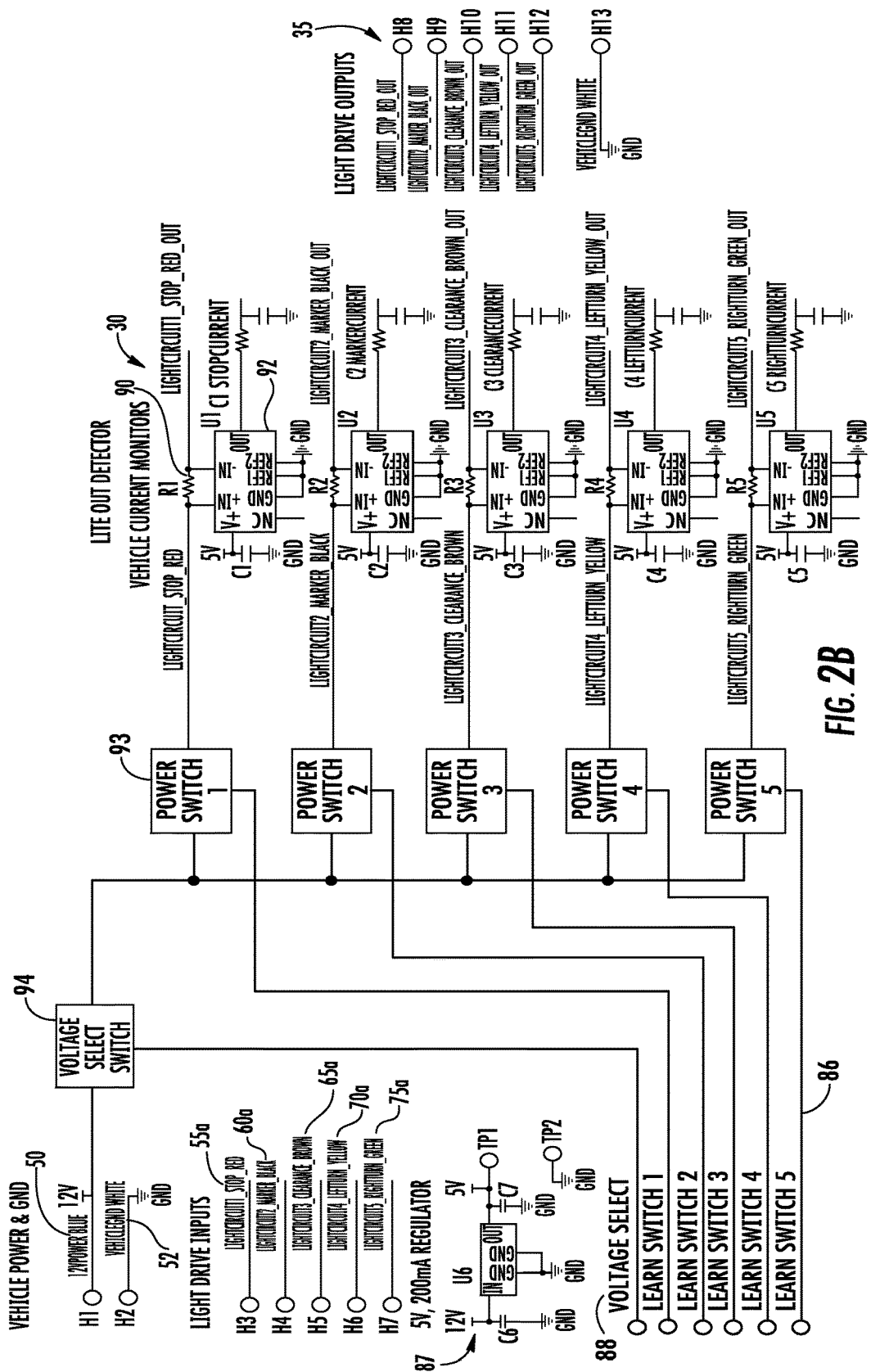
Figure 2C:
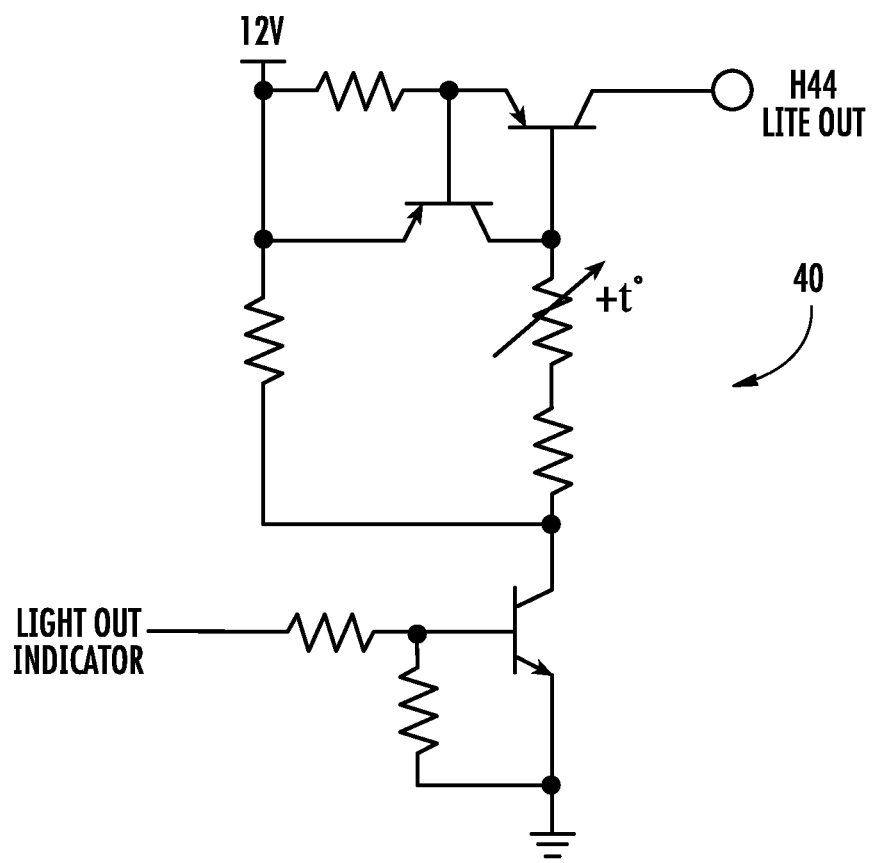

The system includes a single wire light failure indicator output 40, as also shown in FIG. 2C. An abnormally low or high current level in any of the Light Drive inputs 20 will generate a 12 VDC level on the "Light failure Indicator" signal line. If no alarm is present, then this alarm output will be 0V. The Light failure signal will be equipped with a current limit function that will limit the current sourced to the indicator device (LED, buzzer, etc.) to about 200 mA. This current limiting function is implemented using analog circuitry to provide immediate (less than 1 microseconds) response to short circuit conditions.

In one embodiment, the Light failure system also includes a J1708 compatible serial bus output, generally indicated at 45. A 2-wire bus will be made available via 3 wire connections including a ground reference. These wire output signals are summarized as follows: J1708 Data+: Black w/White Stripe Wire 80, J1708 Data−: White w/Red Stripe Wire 82, and Vehicle Ground: White Wire 84.

The Light failure system also includes a push-button or toggle, momentary on-off learn mode activator switch 85 that is accessible by an operator. Activator switch 85, which may be a switch, allows an operator to place the unit into Learn Mode. In one embodiment, the learn mode is activated by flipping a switch, releasing the switch, and flipping the switch again. The Learn Mode will automatically exit upon completion of cycling through the set circuit combinations. Activator switch 85 may also be used to place the system into pre-trip inspection mode.

Once activator switch 85 is activated for learn mode, learn switches 86 are activated in combinations to power each of five circuits in combinations. As shown in the embodiment of FIG. 1, there are five learn switches 86.

Light failure system 10 is also equipped with a voltage regulator 87 for converting the 12V input supply voltage to supply levels required by the Light failure electronics. For example, these levels may be 5.0V and 3.3V. A voltage select or voltage drop circuit 88 is also provided to allow the current and voltage of lighting circuits to be measured at normal and reduced input voltages. In addition, voltage on each Light Circuit is measured using a sampling circuit or voltage level monitor circuit 25 that draws no more than 0.2 mA from each input. Each voltage monitor circuit includes a voltage divider 89 tapped on to the lighting circuit. Voltage monitor circuits 25 feed into ten different analog to digital converter inputs on microprocessor 120. Typically, the converters are 12 bit A/D converters that will provide a resolution of approximately 12.5V/4096 counts=3 mVolts/count. The voltage monitoring circuit is shown in FIG. 2A.

Further, Light failure system 10 measures the current draw on each Light Circuit using an OP-Amp based sampling current monitor circuit 30, as shown in FIG. 2B. Current monitoring is performed using a 0.01-ohm monitoring resistor 90 in series with each Light Drive signal line. At 15 A current levels, resistor 90 has a maximum voltage drop of 0.15 Volts. With a 40 A short circuit current level, resistor 90 has a maximum voltage drop of 0.40 Volts (no more than 0.25 second duration). The voltage across the current monitoring resistor 90 will be monitored using an OP-Amp circuit 92 that will draw no more than 0.2 mA from each Light failure circuit. The OP-Amp circuit 30 will provide a conditioned input to a 12 bit A/D converter that will provide a resolution of approximately 15 A/4096 counts=3.7 mA/count. This resolution assumes a 15 A maximum current draw in each circuit.

FIG. 2B also shows five learn switches 86 and five power switches 93 for applying power to the circuits from the 12V power Blue wire 50 depending on which of the five learn switches 86 are active. This provides operational conditions for microcontroller 120 to learn the current consumption characteristics of the system when a new lamp is installed. This process takes about 10 seconds to cycle through turning on and off the different circuits. A voltage select switch 94 is also provided in line with the voltage select circuit 88 and power wire 50.

The Light failure system includes a fault indicator circuit 40 with an indicator light for indicating the status of the failure detection system. For example, in learn mode the fault indicator light 40 will solidly illuminate. Upon completion of the Learn Mode the fault indicator light 40 will go out. If there is a failed Learn Mode, then the indicator light will rapidly flash until the Learn Mode is reactivated and a complete Learn Mode is achieved. A faulted Learn Mode could include, but is not limited to: a short circuit, one of the circuits being on when Learn Mode was initiated, etc. All circuits are off during the Learn Mode since the Learn Mode will cycle through each of the combinations using the Auxiliary Power (BLUE) circuit to power the individual circuits to gather the current draw data for the microprocessor. For example, fault light indicator may display the following: Learn Mode—Continuous flashes—1 second on, 1 second off; Light Circuit 1 Fault—1 quick flash, 1 second off; Light Circuit 2 Fault—2 quick flashes, 1 second off; Light Circuit 3 Fault—3 quick flashes, 1 second off; Light Circuit 4 Fault—4 quick flashes, 1 second off; and Light Circuit 5 Fault—5 quick flashes, 1 second off. Fault indicator light 40 may be mounted on the roadside corner of the vehicle trailer to be visible by the driver during normal conditions.

A temperature sensor 100 is also included for providing a temperature measurement from −55° C.~125° C. with a minimum of 1° C. accuracy. Temperature sensor 100 will be used by the control electronics to adjust the expected operational lamp current (Normal Light Drive Current Level) for temperature effects.

Light drive inputs 20 and light drive outputs 35 connect to a printed circuit board assembly using wires with terminals, such as 12 GA wires. In one example, light failure system 10 may use printed circuit board such as a standard green FR4, 0.062" thick, 4-layer PCB assembly. However, other circuit boards may be used.

Figure 3A:
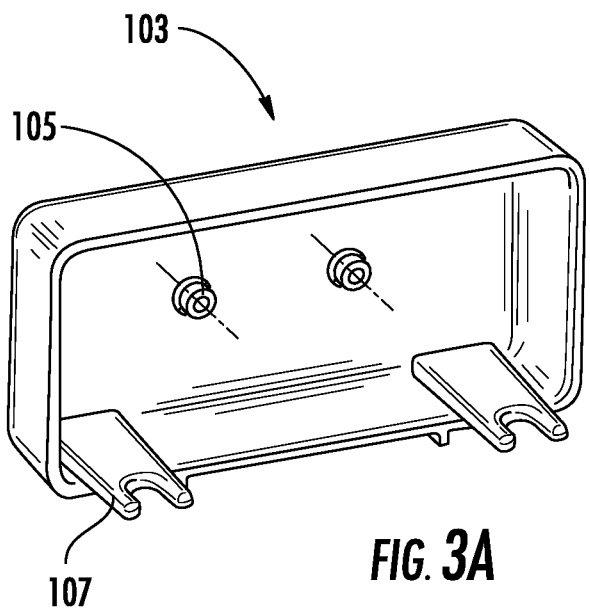
FIG. 3A is a back, perspective view of a mechanical enclosure of the light failure detection system with pre-trip inspection.
Figure 3B:
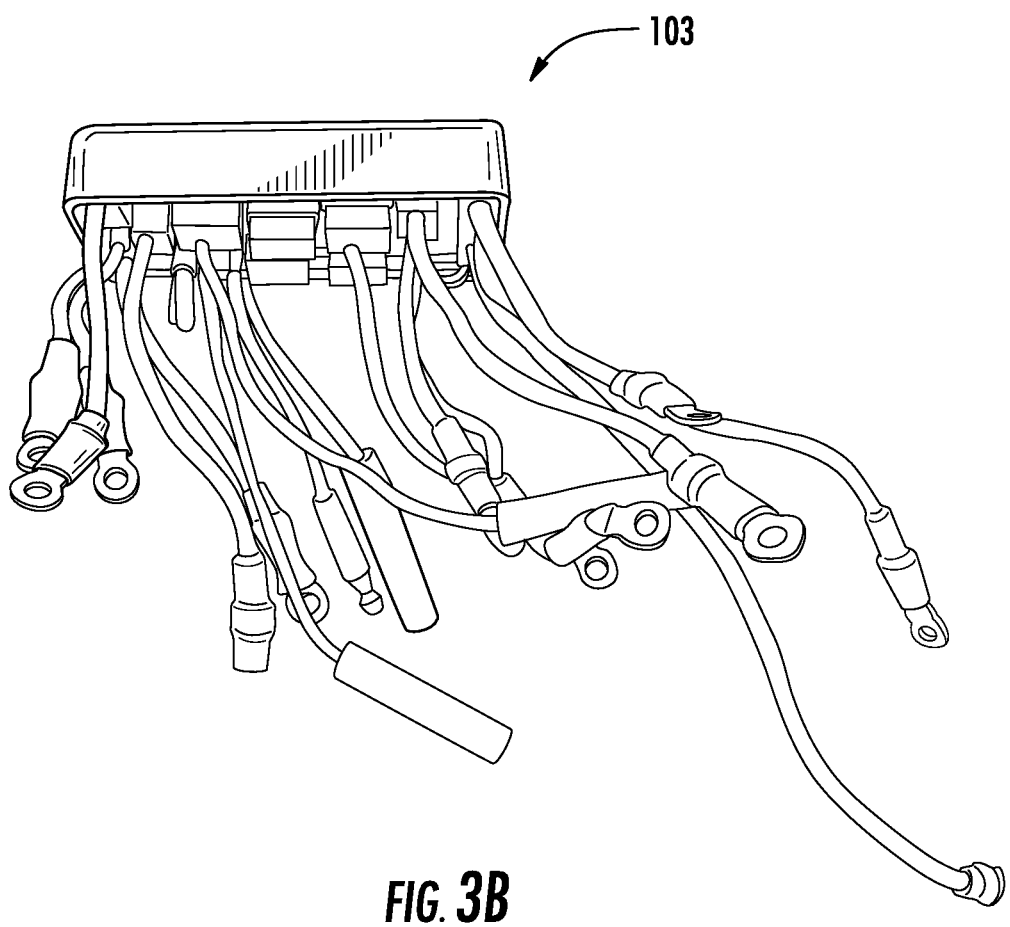
FIG. 3B is a back view of the light failure detection system with pre-trip inspection with a mechanical enclosure.

Further, Light failure system 10 includes a mechanical enclosure 103 for housing the Light failure system electronics. One embodiment of a mechanical enclosure 103 is shown in FIGS. 3A-3B. Mechanical enclosure 103 includes holes 105 for receiving fasteners and projections 107 for facilitating attachment of light failure detection system 10 to a vehicle. Mechanical enclosure 103 is formed of a thermoplastic polymer such as Acrylonitrile butadiene styrene (ABS). Further, for example, the mechanical enclosure 103 may a width of about 4-5 inches, a height of about 1-2 inches and a depth of about 0.5 to 1 inch.

A potting compound may be used to fill mechanical enclosure 103 following the installation of a circuit board and wires. The pigtail wires are installed prior to potting. The potting compound prevents visual and physical inspection of the Light failure electronics assembly and protects the circuitry from the elements. Mechanical enclosure 103 is mounted inside housing 110, as shown in FIGS. 4A and 4B.

Figure 4A:
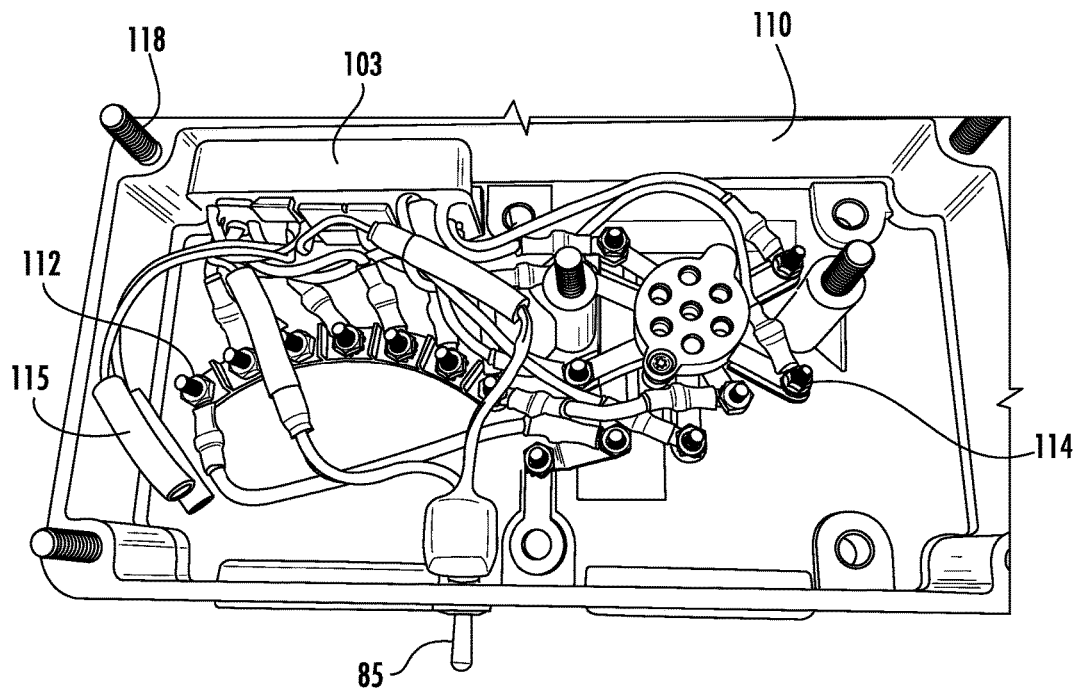
FIGS. 4A and 4B are interior and front views of the light failure detection system with pre-trip inspection.
Figure 4B:
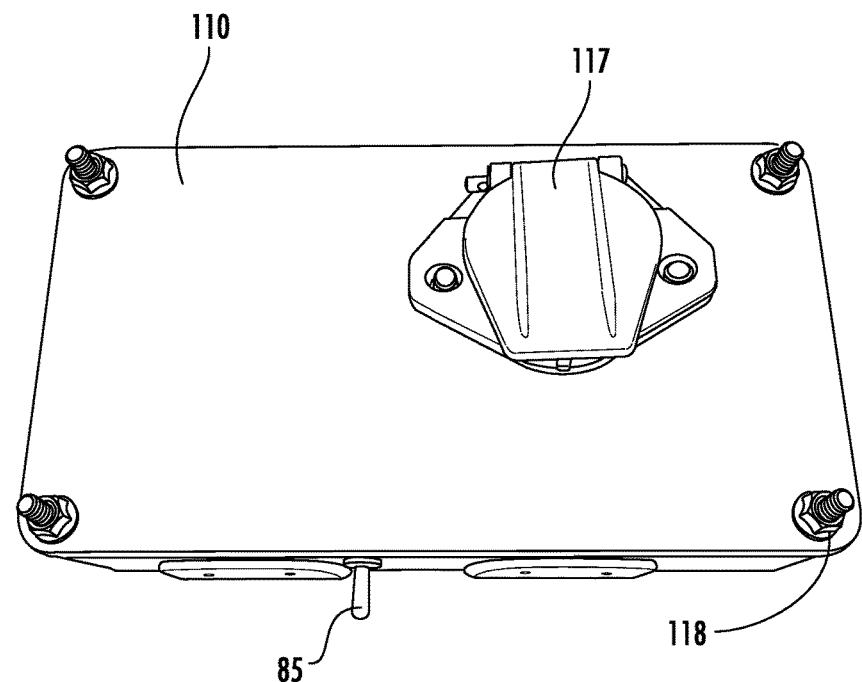

FIGS. 4A and 4B are back and front views of housing 110, respectively. Mechanical enclosure 103 fits within housing 110, as shown in FIG. 4A. Output connections, one of which is indicated at 112, and input connections, one of which is shown at 114, are also contained within housing 110. Input connections 114 are bussed to terminals that connect to a J560 nosebox. Receptacles 115 connect to fault lamp 40. Further, actuator switch 85 extends through an end of housing 110 to be accessed by a user. FIG. 4B shows a front side of the housing including a connection port 117. Housing 110 may be mounted to a vehicle trailer by fasteners 118.

Light failure system 10 includes a learn mode that is activated by an activator switch 85, such as a push-button or switch that allow the vehicle operator to place light failure detection system 10 in Learn Mode. In the learn mode, fault indicator light 40 will solidly illuminate. Upon completion of the Learn Mode the fault indicator light will go out. If there is a failed Learn Mode, then the indicator light will rapidly flash until the Learn Mode is reactivated and a complete Learn Mode is achieved. A faulted Learn Mode could include, but is not limited to, a short circuit, one of the circuits is on when Learn Mode was initiated, etc. It is important to have all circuits off when in Learn Mode since the Learn Mode will cycle through each of the combinations using the Auxiliary Power (BLUE) circuit 50 to power the individual circuits to gather the current draw data for the microprocessor. The Auxiliary power circuit 50 is activated when a coil cord is plugged into a nosebox. Initially, indicator light 40 will illuminate for about 10 seconds while the temperature sensor initiates and to indicate that indicator light 40 is functional. During the Learn Mode, the system uses the Auxiliary Power circuit (BLUE) to systematically power a plurality of combinations of the five Light Drive lines to monitor and record the voltage and current levels on the Light Drive lines. The current levels are stored in the EEPROM in microcontroller 120. Light failure indicator 40 is on during the Learn Mode and goes out upon successful completion of the Learn Mode. The Learn Mode will deactivate on its own following the completion of a successful Learn Mode cycle. At that time, light failure indicator 40 will turn off.

In operational mode, Light failure Detection System 10 provides a visual indicator to a vehicle operator that there is vehicle light malfunction. If a 12 VDC voltage is present on a light signal drive line, then the current level should be approximately equal to the maximum level recorded during Learn mode. Thus, a malfunction is determined by detecting a lower or higher than normal current level on the vehicle light system drive lines. Light failure system 10 monitors the voltage and current levels on the Marker, Clearance, Stop, Left Turn, and Right Turn light signal drive lines (Light Drive Circuits 1-5) to detect the presence of a light system failure. Thus, Light failure detection system 10 continuously monitors the voltage and current levels on all 5 circuits and looks for low or high current levels on those circuits that are energized. The current levels are compared against threshold levels that are established during the Learn mode. In order to determine the status, an operator flips the learn switch quickly, then flips it again and holds it to trigger the module to go into a report mode where it blinks in a pattern to indicate the status. Light failure detection system 10 utilizes an algorithm for detection of Light failure conditions.

Further, Light failure detection system 10 is equipped with microcontroller 120 for providing a variety of control functions and for storing information in an EEPROM. For example, microcontroller 120 monitors the voltage inputs 25 to determine when each lighting circuit is active and measures the currents in the Lite Drive circuits to determine if the current levels are correct for the given input voltages. Microcontroller 120 also activates Light failure indicator switch 125 when a faulty light is detected. The Learn Mode, which monitors the voltages and currents on the lighting circuits and determines what the correct current levels are for a given circuit voltage, is also supported by microcontroller 120. Learn mode switch 85 is also monitored by microcontroller 120 to determine when an operator has activated the Learn Mode. Valid voltage and current levels, as determined by the learn mode, are also stored in non-volatile memory by microcontroller 120. In addition, microcontroller 120 also controls light failure indicator 40 to indicate correct power function and to indicate when the Learn Mode is active (LED blinking). System temperatures are also monitored by microcontroller 120, which then adjusts lamp current thresholds to compensate for current changes with temperature. The system also adjusts the current thresholds based on the input voltage on each circuit.

Light failure system 10 includes software capable of system initialization and health status monitoring, light drive current and voltage measurement, current threshold calculations used to set Light failure alarms, Learn Mode Functions, Light failure Indicator Switch Control, J1708 Serial Bus Message Input/Output, LED Indicator Control, Parameter Memory management, and Temperature Sensing and current threshold adjustment.

Figure 5A:
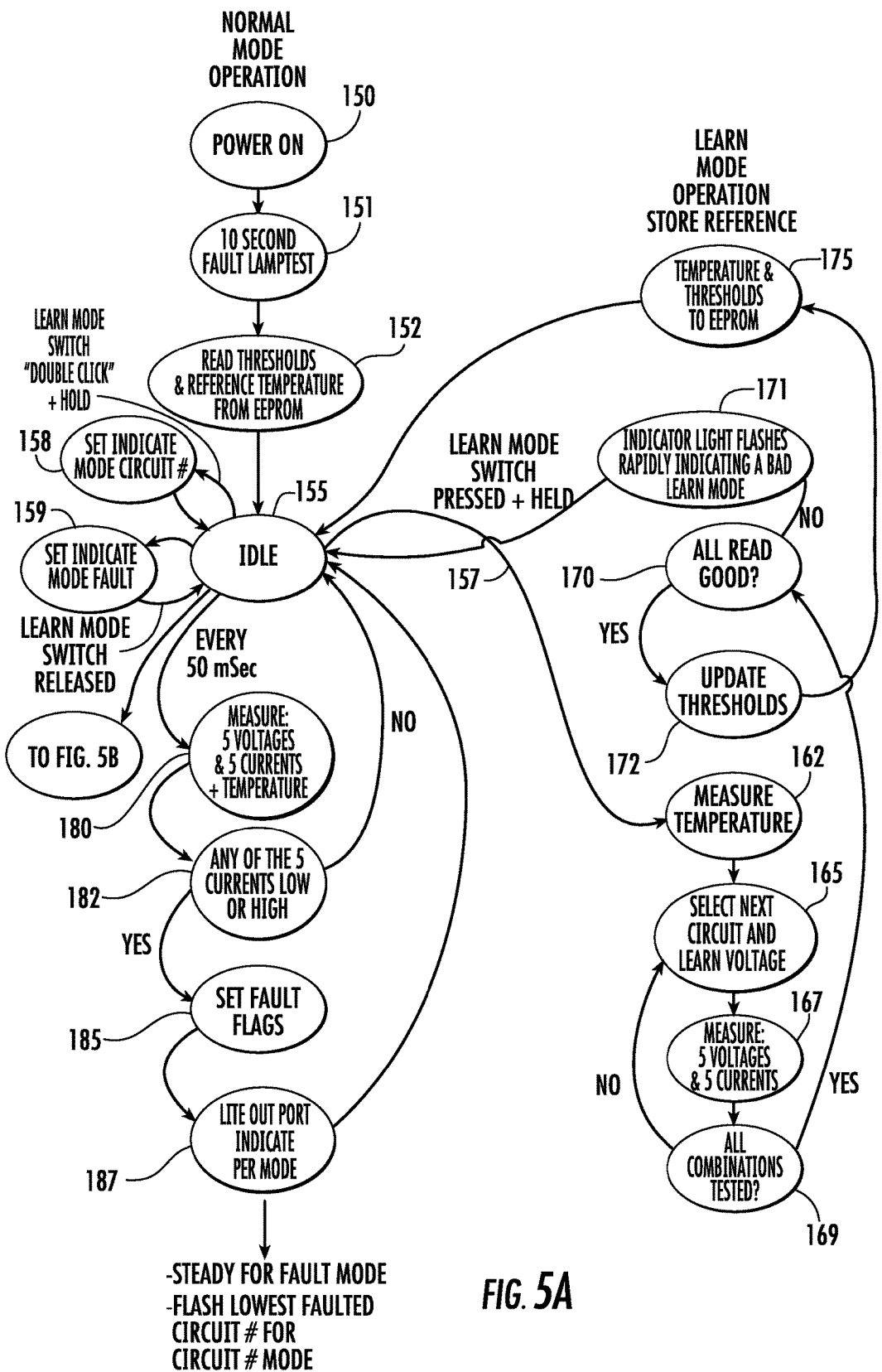
FIGS. 5A and 5B are a flow diagram of normal and learn modes of the light failure detection system with pre-trip inspection.
Figure 5B:
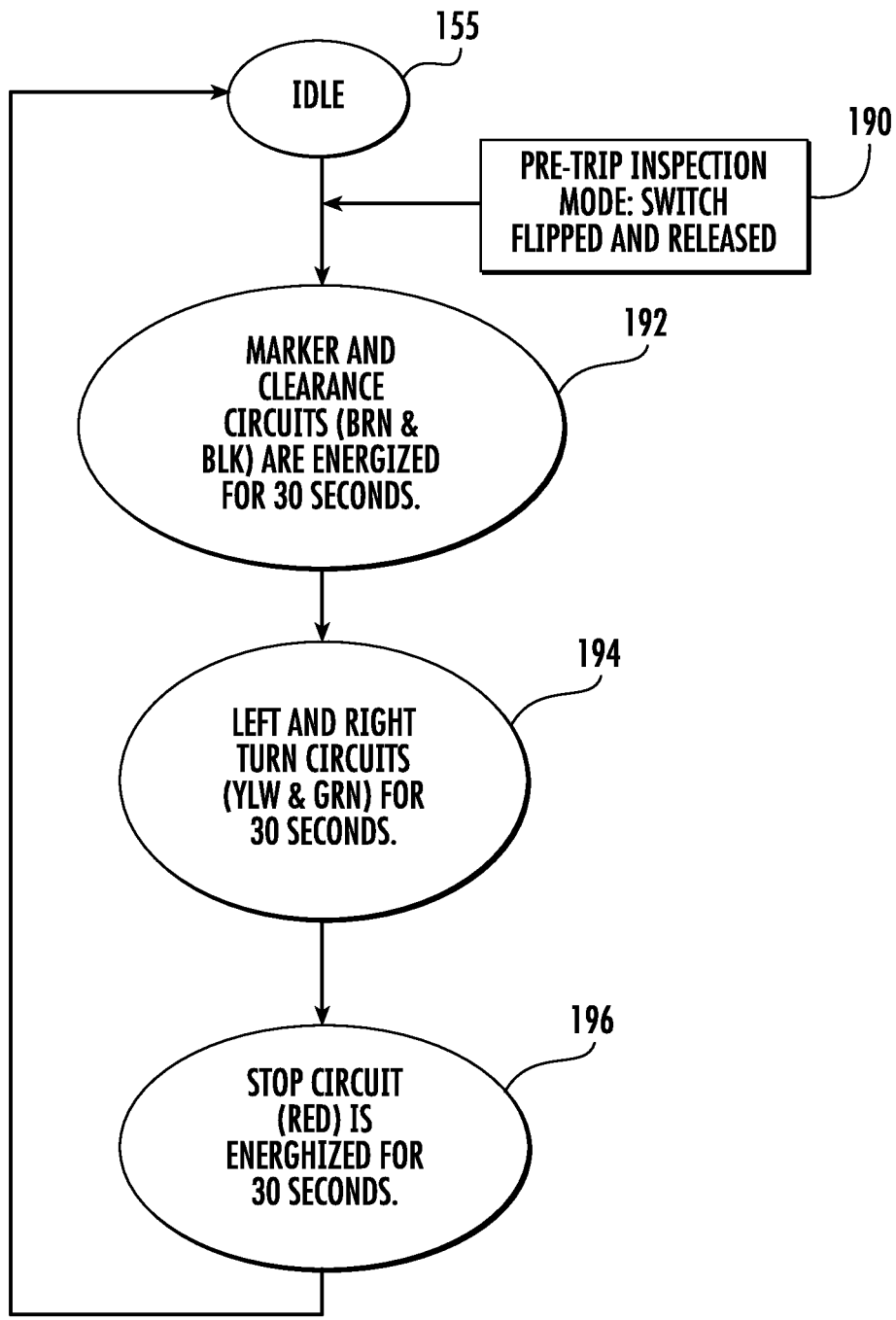
Figure 6:
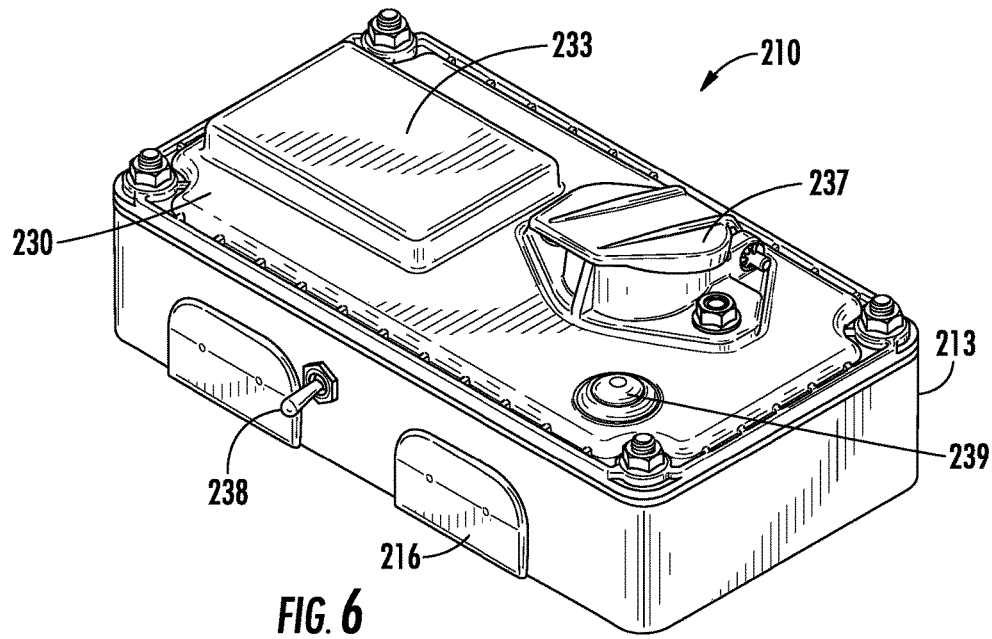
FIGS. 6, 7, 8, and 9 are perspective, front, side and end views of an additional embodiment of a light failure detection system.
Figure 7:
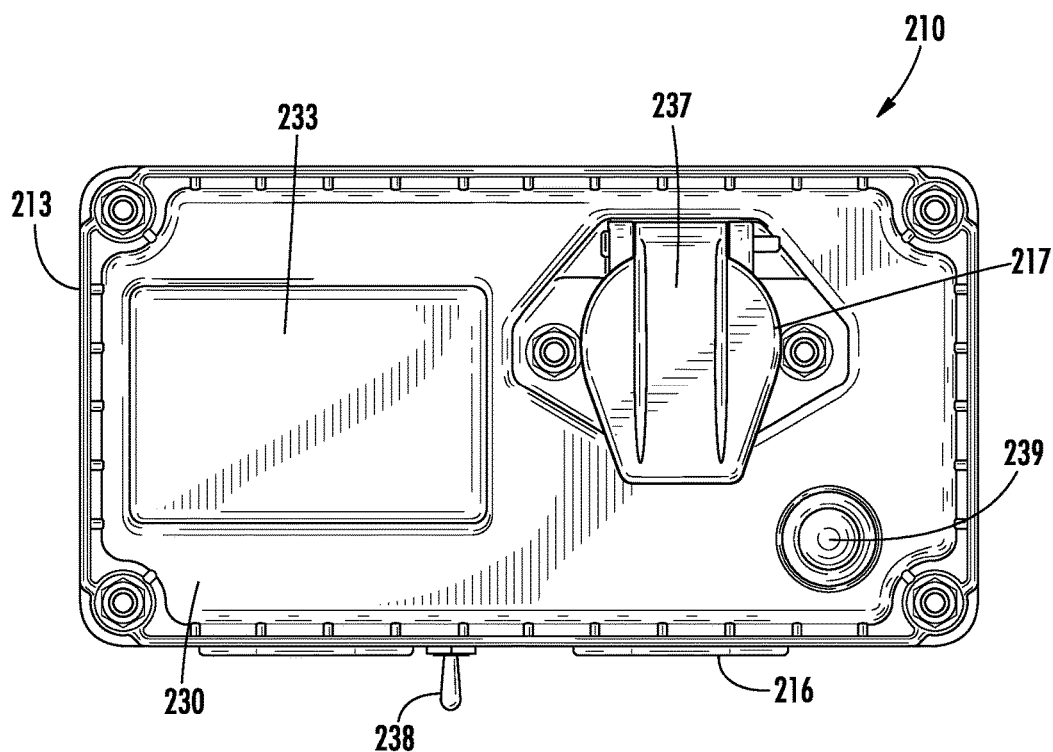
Figure 8:
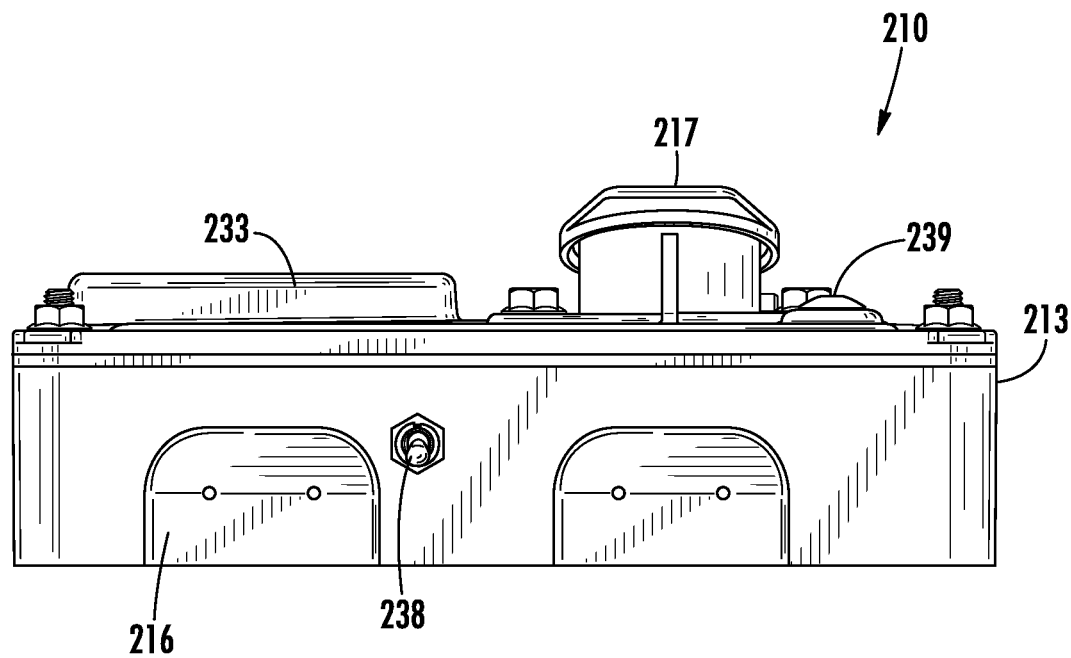
Figure 9:
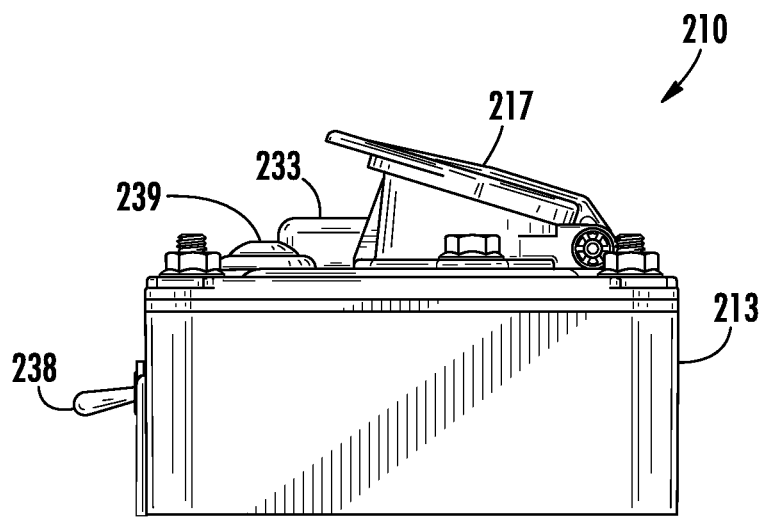

Light failure system 10 is also equipped with a pre-trip inspection mode which allows an operator to check the operational status of the LED trailer lights, as described in FIG. 5B. Actuator switch 85 is flipped and released to activate the pre-trip inspection mode as shown in step 190. Initially, the Marker and Clearance (BLACK and BROWN) light circuits will be turned on for 30 seconds as shown in step 192. The Right Turn and Left Turn (GREEN and YELLOW) circuits will then be activated for 30 seconds as in step 194, followed by the Stop (RED) light circuit for 30 seconds as in step 196. This allows a driver to walk around a vehicle trailer to verify that the LED devices or lamps are working properly. Following the completion of the cycle of the Stop light circuit, the pre-trip inspection mode automatically turns off and the system goes into monitoring mode. The steps may be repeated to initiate another pre-trip inspection sequence.

The following table shows an example of the calculated maximum expected currents for each light drive circuit that the Light failure system 10 will be monitoring.

TABLE 1

Example Maximum Expected Current for Each Light Drive Circuit

| Lamp Type | Current Maximum (Amps) | # Lamps on Red Circuit "Stop" | # Lamps on Black Circuit Marker | # Lamps on Brown Circuit Clearance | # Lamps on Yellow Circuit Left Turn | # Lamps on Green Circuit Right Turn |
|---|---|---|---|---|---|---|
| ABS ECU | 7.1 | | | | | |
| Red Marker, Clearance (M/C) lamp | 0.065 | | 3 | 2 | | |
| License lamp | 0.140 | | | 1 | | |
| Amber M/C lamp | 0.065 | | 2 | | | |
| Stop/Tail/Turn lamp | 0.023 | | 2 | 2 | | |
| | 0.345 | 4 | | | 1 | 1 |
| Mid-turn Lamp | 0.1 | | | 2 | | |
| | 0.6 | | | | 1 | 1 |
| Total Current | | 1.38 | 0.371 | 0.516 | 0.945 | 0.945 |

Table 1 shows an example of an expected current for each Light Drive circuit as 1.38 Amps or less. Thus, light failure detection system 10 monitors a maximum of 5 Amps in order to handle any expected system growth and provide improved current monitoring resolution. For example, with a maximum 5 A draw (3.6× the expected current) the current monitoring resolution is 5 A/4096 Counts=1.22 mA/count. This resolution is adequate to successfully monitor current levels in each Light Drive circuit and detect failed lamps. An additional 7.1 A shows on the Red Stop circuit since the RED circuit goes to the ABS ECU. This is a temporary (10 seconds or less) 7.1 A current flow. The Light failure system may indicate a fault during the time when this extra current is being drawn, which is acceptable system behavior. The system monitors a failed light condition up to 5 Amps per circuit, with a maximum per circuit of 15 Amps. Between 5 A and 15 A the effectivity of the system to monitor for a failed lamp decreases as the current increases.

The current thresholds used to determine the presence of a failed lamp are approximately 50% or less of the nominal current drawn of the lowest current lamp on the circuit. The current thresholds are defined as follows:

TABLE 2

| | |
|---|---|
| Circuit 1 (Red - Stop) | 8 mA |
| Circuit 2 (Black - Marker) | 8 mA |
| Circuit 3 (Brown - Clearance) | 8 mA |
| Circuit 4 (Yellow - Left Turn) | 8 mA |
| Circuit 5 (Green - Right Turn) | 8 mA |

The thresholds shown in Table 2 are the current variations (i.e. reductions or increases) allowed on an energized circuit before a fault is declared.

The current level on each of the circuits is dependent on which other circuits are energized since many of the lamps are driven by two different light circuits and share common circuitry. This common circuitry makes the current level on any circuit dependent on which other circuits are energized. The combinations of energized circuits shown in Table 3 are monitored in order to account for this dependency. Each row in the table is a combination of energized circuits.

TABLE 3

Circuits Energized

| | | | | |
|---|---|---|---|---|
| Circuit 1 | | | | |
| Circuit 1 | Circuit 2 | | | |
| Circuit 1 | Circuit 3 | | | |
| Circuit 1 | Circuit 4 | | | |
| Circuit 1 | Circuit 5 | | | |
| Circuit 1 | Circuit 2 | Circuit 3 | | |
| Circuit 1 | Circuit 2 | Circuit 4 | | |
| Circuit 1 | Circuit 2 | Circuit 5 | | |
| Circuit 1 | Circuit 3 | Circuit 4 | | |
| Circuit 1 | Circuit 3 | Circuit 5 | | |
| Circuit 1 | Circuit 4 | Circuit 5 | | |
| Circuit 1 | Circuit 2 | Circuit 3 | Circuit 4 | |
| Circuit 1 | Circuit 2 | Circuit 3 | Circuit 5 | |
| Circuit 1 | Circuit 2 | Circuit 4 | Circuit 5 | |
| Circuit 1 | Circuit 3 | Circuit 4 | Circuit 5 | |
| Circuit 1 | Circuit 2 | Circuit 3 | Circuit 4 | Circuit 5 |
| Circuit 2 | | | | |
| Circuit 2 | Circuit 3 | | | |
| Circuit 2 | Circuit 4 | | | |

TABLE 3-continued

| Circuits Energized | | | |
|---|---|---|---|
| Circuit 2 | Circuit 5 | | |
| Circuit 2 | Circuit 3 | Circuit 4 | |
| Circuit 2 | Circuit 3 | Circuit 5 | |
| Circuit 2 | Circuit 4 | Circuit 5 | |
| Circuit 2 | Circuit 3 | Circuit 4 | Circuit 5 |
| Circuit 3 | | | |
| Circuit 3 | Circuit 4 | | |
| Circuit 3 | Circuit 5 | | |
| Circuit 3 | Circuit 4 | Circuit 5 | |
| Circuit 4 | | | |
| Circuit 4 | Circuit 5 | | |
| Circuit 5 | | | |

Table 4 illustrates baseline currents and current drops due to multiple circuits being simultaneously energized with reference to the system outlined in Table 1.

TABLE 4

| Circuit Current (With other Circuits Energized) | Measured Current (mA) | Delta (mA) |
|---|---|---|
| C1 (none) | 414.0 | |
| C1 (C2) | 411.9 | 2.1 |
| C1 (C3) | 407.4 | 6.6 |
| C1 (C4) | 411.4 | 2.6 |
| C1 (C5) | 411.4 | 2.6 |
| C1 (C2 & C3) | 406.1 | 7.9 |
| C1 (C2 & C4) | 409.3 | 4.7 |
| C1 (C3 & C4) | 405.5 | 8.5 |
| C1 (C2 & C3 & C4) | 404.0 | 10.0 |
| C1 (C2 & C3 & C5) | 404.3 | 9.7 |
| C1 (C2 & C3 & C4 & C5) | 402.3 | 11.7 |
| C2 (none) | 307.9 | |
| C2 (C1) | 306.5 | 1.4 |
| C2 (C3) | 307.2 | 0.7 |
| C2 (C4) | 291.6 | 16.3 |
| C2 (C5) | 291.5 | 16.4 |
| C2 (C1 & C4) | 290.5 | 17.4 |
| C2 (C1 & C3 & C4) | 290.0 | 17.9 |
| C2 (C1 & C3 & C4 & C5) | 274.0 | 33.9 |
| C3 (none) | 277.9 | |
| C3 (C1) | 245.6 | 32.3 |
| C3 (C2) | 277.0 | 0.9 |
| C3 (C4) | 206.3 | 71.6 |
| C3 (C5) | 206.3 | 71.6 |
| C3 (C4 & C5) | 134.8 | 143.1 |
| C3 (C1 & C4 & C5) | 114.3 | 163.6 |
| C3 (C1 & C2 & C4 & C5) | 117.3 | 160.6 |
| C4 (none) | 441.7 | |
| C4 (C1) | 439.0 | 2.7 |
| C4 (C2) | 437.6 | 4.1 |
| C4 (C3) | 398.8 | 42.9 |
| C4 (C5) | 437.6 | 4.1 |
| C4 (C1 & C5) | 434.5 | 7.2 |
| C4 (C1 & C2 & C5) | 430.4 | 11.3 |
| C4 (C1 & C2 & C3 & C5) | 388.9 | 52.8 |
| C5 (none) | 449.2 | |
| C5 (C1) | 446.3 | 2.9 |
| C5 (C2) | 444.8 | 4.4 |
| C5 (C3) | 406.0 | 43.2 |
| C5 (C4) | 446.5 | 2.7 |
| C5 (C1 & C2) | 442.1 | 7.1 |
| C5 (C1 & C2 & C4) | 439.4 | 9.8 |
| C5 (C1 & C2 & C3 & C4) | 398.4 | 50.8 |

LED Status indicator light 40 is configured to alert an operator of the status of light failure detection system 10. For example, if LED Status indicator light 40 is OFF at power up then the threshold values have not been set. If LED Status indicator light 40 is OFF after completing a Learn Mode, then all of the thresholds have not been set and the Learn mode must be repeated. All 15 combinations of circuit activation must be implemented to complete the Learn mode. If LED Status indicator light 40 is ON, without blinking, then all thresholds are set, Power is on, and No faults are present. Fault conditions are indicated by the following blink patterns: 1 Blink: Fault on Circuit 1; 2 Blinks: Fault on Circuit 2; 3 Blinks: Fault on Circuit 3; 4 Blinks: Fault on Circuit 4; and 5 Blinks: Fault on Circuit 5.

FIG. 5A illustrates a flow diagram of Normal and Learn modes of operation of light failure detection system 10. Initially, a power on button or switch is activated as indicated at 150 and a 10 second fault lamp test is performed as indicated at 151. Stored threshold values and reference temperatures are then read from the non-volatile memory in the microprocessor (EEPROM) as shown at 152. The system then transitions into an idle state as indicated at 155. From idle state 155 a learn mode switch may be triggered by pressing and holding the learn mode switch as shown at 157. Alternatively, the learn mode switch may be double clicked and held in order to set a mode circuit number as shown in 158 or to set a mode fault as shown at 159. If the switch is pressed and held to trigger the learn mode 157, the system initially measures the temperature 162. The next circuit and learn mode voltage is then selected as indicated at 165. The current and voltage is then measured for each of the five circuits in 167. If all combinations have not been tested, as required in step 169, the system returns to step 165 and selects the next circuit and learn mode voltage and the performs step 167 of measuring the current and voltages for each circuit. If it is determined that all combinations have been tested, the system determines if all reads are acceptable in step 170. If all reads are acceptable, the threshold and temperatures are updated as indicated in step 172. The system then transitions to Normal Mode and the observed current levels (thresholds) are stored in non-volatile memory in the microcontroller in step 175. In one embodiment, during Learn Mode the system monitors the voltage level on the 5 light circuits and stores these Calibration Voltage levels in Non-volatile memory. The system then transitions into an idle state as shown in 155. If all reads are not acceptable in step 170, the system will create a rapid flash on the fault lamp indicating a failed learn mode as shown in step 171. It will remain in this state until the Learn Mode is reactivated and a successful learn has been achieved.

At system start the current thresholds are read from non-volatile memory in step 152 and used as the baseline "working" current levels for each circuit combination. These baseline current thresholds are adjusted as needed for changing voltage and temperature. The system transitions to idle state 155 and then measures the voltages and currents every 50 mSec as indicated in step 180. If any of the measured currents are low or high, as noted in step 182, the following steps are performed for each light circuit. Initially, it is determined which Light Circuits are energized. It is then determined which of the baseline circuit thresholds should be used. The baseline threshold is then adjusted for Voltage and temperature. The newly measured current level is then compared to the voltage/temperature adjusted threshold. If the new current measurement is lower or higher than the adjusted threshold by the amount listed in Table 2, then a fault flag is set for that circuit in step 185. The light failure port is illuminated as noted in step 187. Typically, three consecutive failed readings are necessary to trigger the fault lamp in order to reduce false positive readings. Once a failure is detected an operator may flip and hold the momentary switch, which causes the fault lamp to blink the circuit number where the failure was found. Releasing the momentary switch puts the module back in to monitoring mode.

A voltage drop circuit that can be switched on or off is coupled to the Auto-Learn circuits. The current and voltage measurements are taken at both voltages and stored. This allows the voltage sensitivity and detection threshold of each circuit to be computed directly regardless of the circuit's configuration. Temperature correction calculations are proportional to the current measured during calibration rather than additive. Further, the Learn process detects circuits that share current and change the calculations when both current sharing circuits are on at the same time. Current amplifier offsets are also measured during the Learn process. Offset corrections are applied when open circuits are detected during the Learn mode.

Different LED lamps have different configurations of LEDs, Resistors, and Diodes. Each configuration responds differently to a change in voltage. Dual brightness lamps (Stop/Tail or Mid-Turn) have additional effects that appear when both high and low brightness circuits are activated at the same time.

For example, voltage sensitivities may be as follows: Marker lamp: nominal 60 mA, sensitivity 5.5 mA/Volt; License lamp: nominal 140 mA, sensitivity 14 mA/Volt; Stop/Tail lamp, High circuit: nominal 220 mA, sensitivity 80 mA/Volt; and Stop/Tail lamp, Low circuit: nominal 43 mA, sensitivity 10 mA/Volt. The sensitivity slopes proportional to the nominal current varies due to different LED string lengths and different resistor values: i.e., Marker lamp sensitivity slope=5.5/60=0.092 mA/mA/Volt and Stop lamp sensitivity slope=80/220=0.364 mA/mA/Volt.

It has also been discovered that in a Stop/Tail lamp when a High brightness circuit is active, the current in the low brightness drops to zero. Further, in a Mid-Turn lamp, when both the high and low brightness circuits are active, the current is shared between the two circuits. The percentage split in this sharing is very sensitive to the voltage difference between the two circuits. Therefore, the current in each circuit may be unpredictable. For example, a 0.1 Volt change in the low brightness circuit voltage can halve or double the current in the low circuit side of the lamp. However, the sum of the currents provided by each circuit is consistent. The affected circuits containing these types of lamps can be readily detected during calibration and have appropriate detection calculations applied.

Laboratory measurements of the voltage sensitivity of various LED lamps also showed that resistance dominates in the effects over the voltage range of 10.5 Volts to 14.5 Volts. The sensitivity is relatively constant over this voltage range. The measured variation from constant ranged from 0% to +/−6.5%. The higher percentages were present in lamps that operate at higher current and have a higher margin for error in detection of lamp out current differences.

Example lamp configurations and their resulting voltage sensitivities are as follows: Four Marker lamps and two Stop/Tail lamps on a tail circuit use 326 mA total and have a sensitivity of 42 mA/Volt. If four more Marker lamps are added to the circuit, the usage is 566 mA total with a sensitivity of 64 mA/Volt. When a License lamp is moved to the Marker circuit the usage is 706 mA total with a sensitivity of 78 mA/Volt.

The allowed difference between the measured current (C_now) and the adjusted reference current (T-adjusted threshold) is the current delta. This number is based on ¼ of the lowest current lamp used in each circuit operating at the lowest functional voltage (10.5 Volts). It is currently 8 mA for circuits incorporating single LED marker or clearance lamps and 100 mA in other circuits.

In the learn mode, thresholds and voltage sensitivities are calculated. For example, the current (C_low) and voltage (V_low) are measured at a reduced voltage. In addition, the current (C_high) and voltage (V_high) are measured at normal input voltage. The normal input is a variable that depends on the vehicle powering up the system. For example, the normal input voltage may be about 13.0 V. The reduced voltage is 0.7V lower than the normal input voltage. The measured values for C_high and V_high are used as the reference values for detection (C_ref and V_ref). The voltage sensitivity is determined by: Sensitivity=(C_high−C_low)/(V_high−V_low). For example, the sensitivity is calculated as follows: 45 mA/V=(0.564 A−0.532 A)/(13.5V−12.8V).

The process is repeated for each circuit combination. The temperature (T_ref) is also measured during the learn process. The system also detects Shared Circuits. Initially, the currents are measured for the single active circuit configurations. The currents are then measured for each two-circuit configuration. If the current for a two-circuit configuration is less than the one-circuit current by at least 15 mA for both circuits, then it is determined that the circuits share current. The combination is then flagged for a "Shared Current" detection calculation.

If an active circuit combination is determined to be a shared current combination the sum of the active currents (C_now) and the sum of the adjusted C_ref currents is calculated. The sums are compared. The largest allowed current delta among the active circuits is selected and the lower limit is set to this value. If allowed current deltas are different among the active circuits, then the upper limit is set to a predetermined value. For example, the upper limit may be set to 3 times the lowest current delta or another value. If the current deltas are not different among the active circuits, then the upper limit is the allowed current delta. It only applies to over current (a much rarer condition) in the circuit when shared lamps are being activated by multiple circuits. When the shared lamp is being activated by a single circuit then the regular upper limit will apply and a smaller over current will be detected.

Voltage and temperature corrections are performed to determine the adjusted reference current (T-adjusted threshold). The voltage adjusted threshold is determined as follows: V-adjusted threshold=C_ref+((V_now−V_ref)*Sensitivity). A temperature correction is then performed. Initially, a T_const (a laboratory measured value) is selected based on the active circuit and T_now greater or equal to T_ref; T_now less than T_ref and T_now greater or equal to zero degrees C.; and T_now less than T_ref and T_now less than zero degrees C. For example, T_const may be 0.002 A/A/C. The temperature adjusted threshold is calculated as follows: T-adjusted threshold=V-adjusted threshold*(1+(T_const*(T_now−T_ref))).

If C_now is less than (T-adjusted threshold−lower limit) or C_now greater than (T-adjusted threshold+upper limit) then there is a lighting circuit fault (activate fault indication). If it is a shared circuit the C_now sum, sum of T-adjusted thresholds, and modified limits are used to determine a lighting circuit fault.

An additional embodiment of a Lite-Out Detection System (LODS) 210, as shown in FIGS. 6-11, may be configured to communicate with a telematics system master control unit or external device (such as a Tr/IPS™ MCU (Master Control Unit) by TrackPoint Systems, LLC of Nashville, Tenn.). The telematics system sends, receives and stores data acquired from light failure detection system 210 and communicates the data to external display devices through radio frequency power line carrier or light (fiber optic) communication. Light failure detection system is capable of multi-volt operation, such as 12V/24V, 10-30V, and 10-42V. Further, light failure detection system 10 includes LED and Incandescent Lamp capabilities (capable of determining current between LED/Incandescent), monitoring of Anti-Lock Brake System (On/Off), battery power for un-tethered operation to facilitate: Asset Location Determination and/or Asset Remote Diagnostic Check. The light failure detection system may be used in conjunction with multiple trailer configurations (PUP's) and additional sensors including wireless (Radio Frequency (RF) or Optical) or hardwired sensors.

Figure 10:
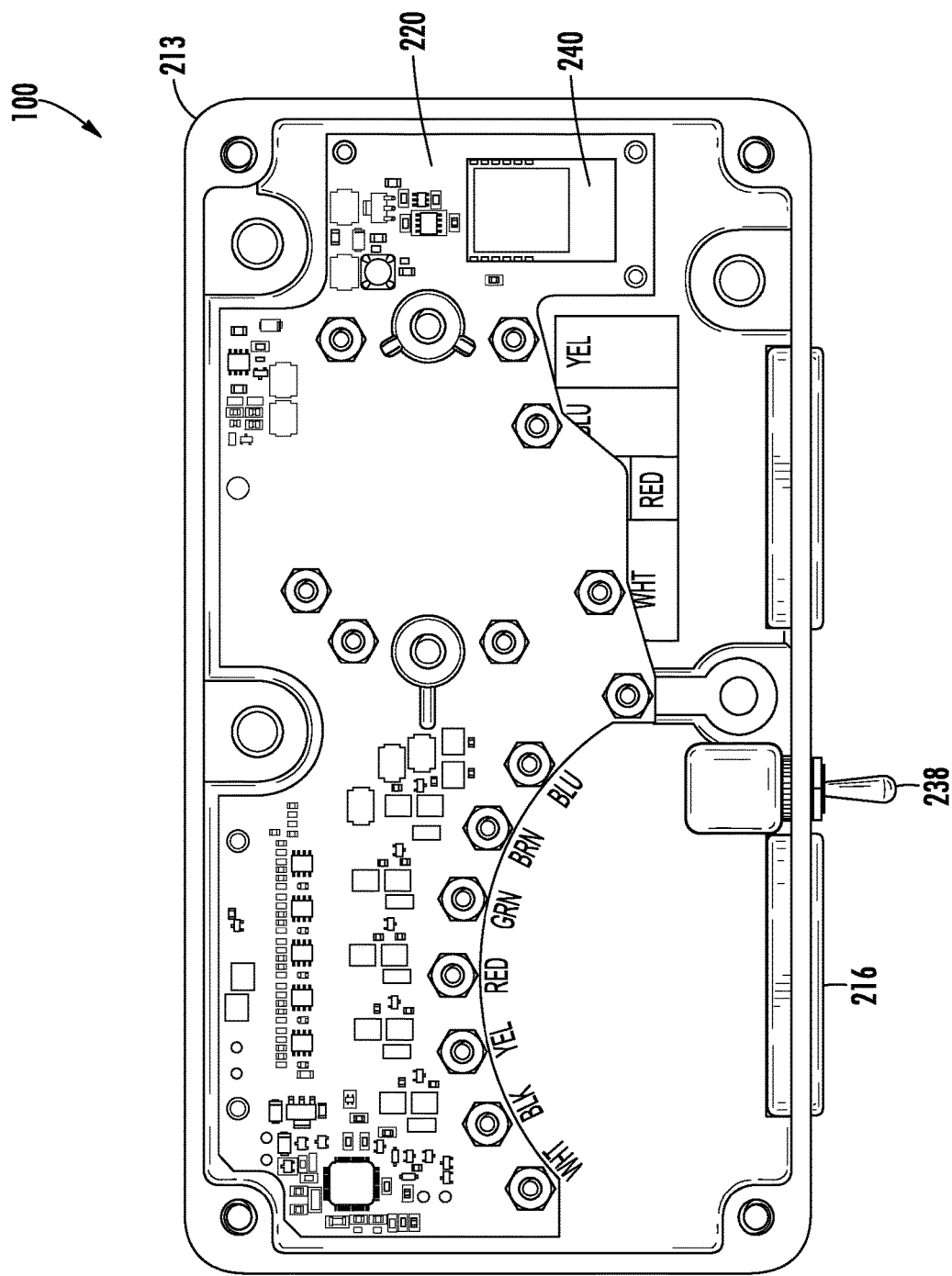
FIG. 10 is a top view of a circuit board assembly within a nosebox housing.
Figure 11:
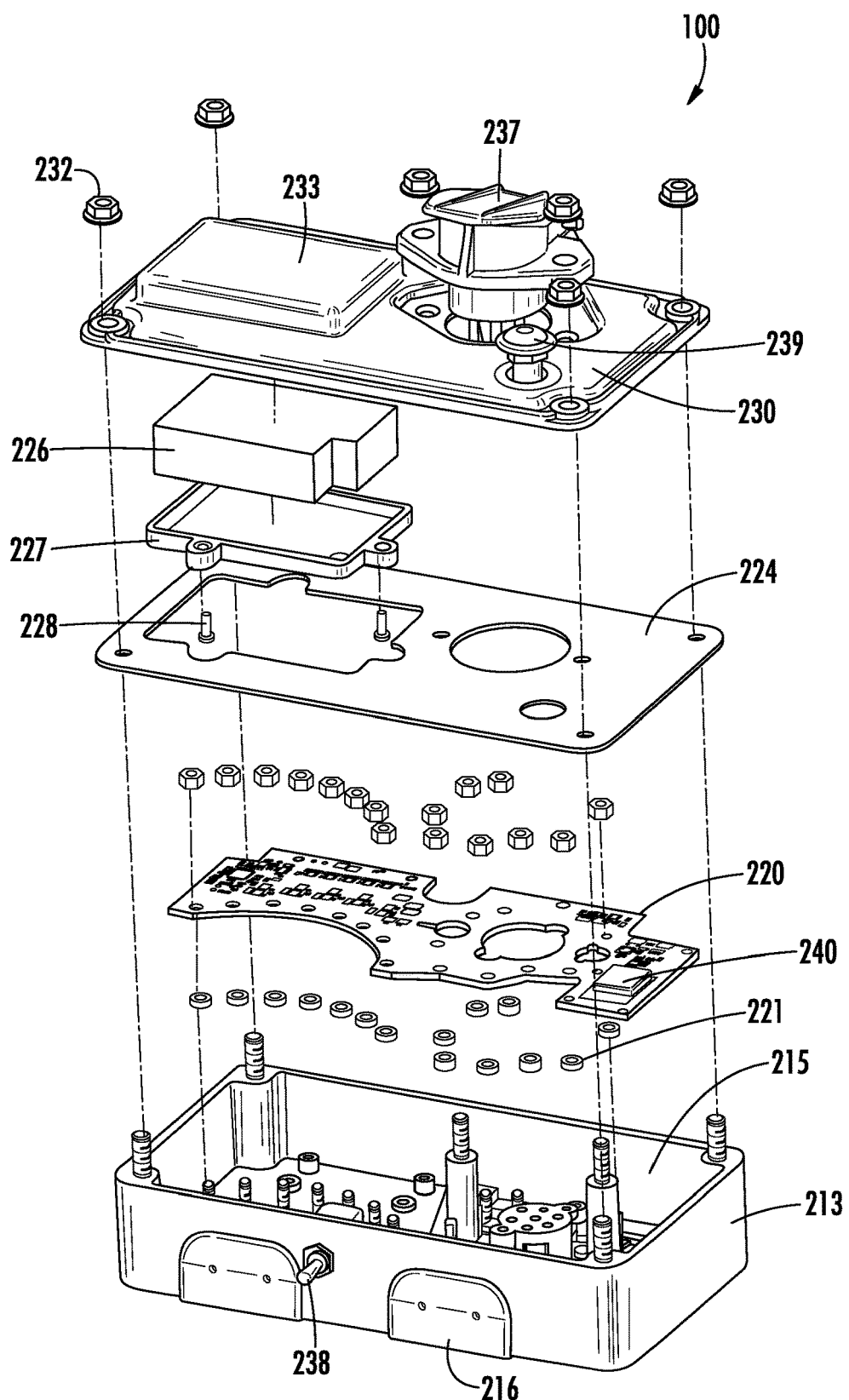
FIG. 11 is an exploded view of a light failure detection system.

FIGS. 6, 7, 8, and 9 are perspective, front, side and end views of light failure detection system 210, respectively. FIG. 10 is a top view of a circuit board assembly within a nosebox housing 213 and FIG. 11 is an exploded view of light failure detection system 210. Nosebox housing 213 includes an interior space 215 for receiving a light failure detection circuit board 220. Cable grommets 216 are also provided on housing 213. Spacers 221 are positioned under circuit board 220 and a cover gasket 224 is positioned over circuit board 220. A rechargeable lead-acid battery 226 and battery cover 227 are also provided and aligned with battery cover fasteners 228. Nosebox cover 230 is positioned over housing 213 and is secured with hex flange nuts 232. Cover 230 includes a protruding pocket 233 for accommodating battery 226. A SAE J560 socket receptacle 237 is mounted to nosebox cover 230. Light failure system 210 also includes activator switch 238 and indicator light 239.

Light failure detection system 210 may include a wireless transmitting device with a communication protocol such as: Zigbee, Bluetooth, etc. that will transmit signals to the master control unit or other remote device such as a laptop, tablet, or cell phone. In the depicted embodiment, a Zigbee transceiver 240 is mounted to circuit board 220.

Figure 12:
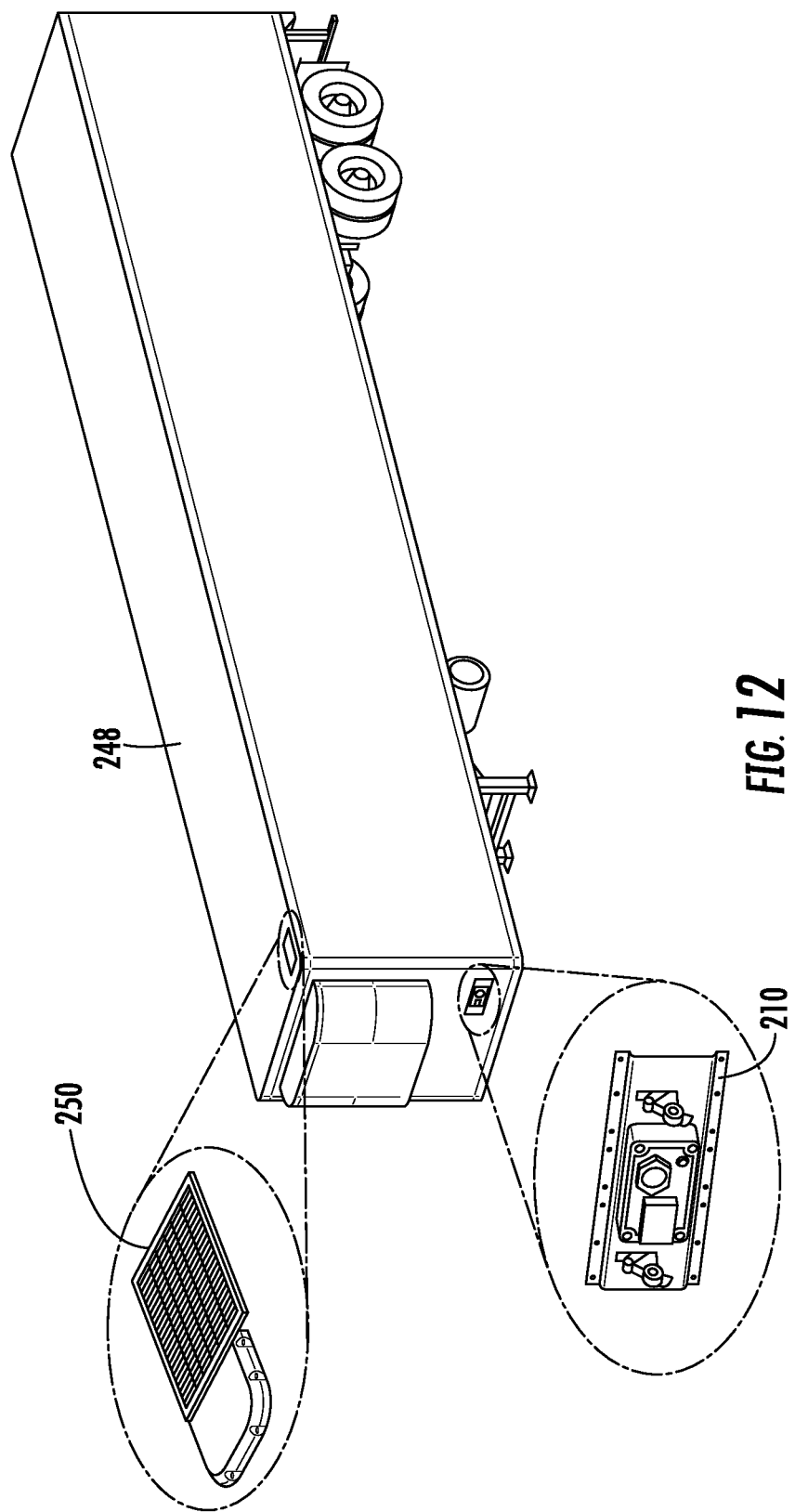
FIG. 12 illustrates a light failure detection system and a master control unit attached to a trailer.
Figure 13:
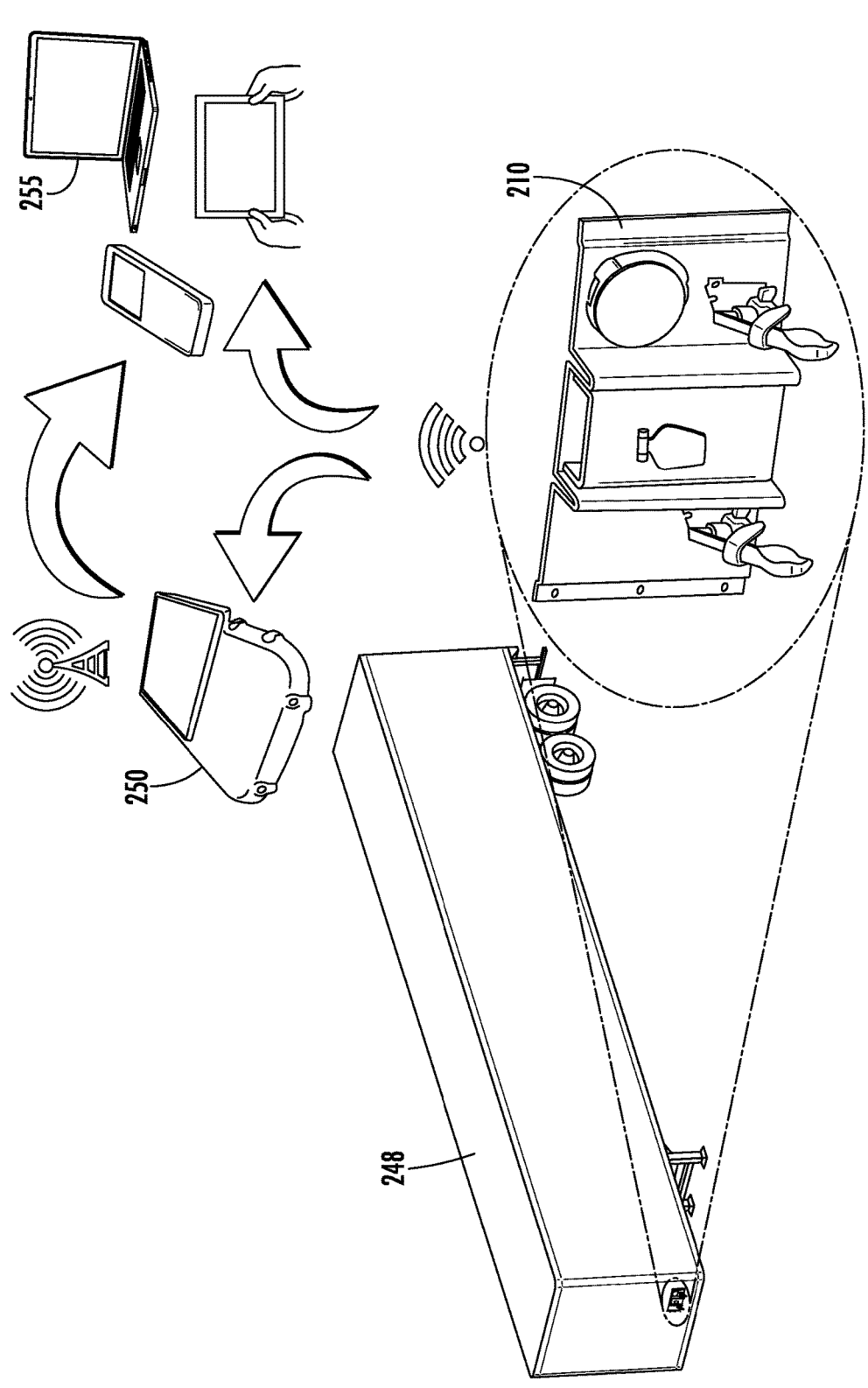
FIG. 13 illustrates the light failure detection system attached to a trailer and in communication with the master control unit, which is in communication with a remote user interface.

FIG. 12 illustrates light failure detection system 210 and a master control unit 250 attached to trailer 248. FIG. 13 illustrates the light failure detection system 210 attached to a trailer 248 and in communication with master control unit 250, which is in communication with a remote user interface 255. As shown in FIGS. 12 and 13, light failure detection system 210 includes circuitry to analyze light emitting diode (LED) performance through the trailer's wiring harness. The light failure detection system 210 includes a long-range RF wireless module 240 and battery 226 for untethered LED monitoring. A toggle switch 238 is provided for pre-trip light inspections and LED failure analysis. The LODS 210 monitors each lighting circuit independently and reports each circuit individually with real-time current readings. The onboard temperature chip even takes temperature readings into consideration when calculating the measured currents ensuring accuracy. Battery powered functionality allows for remote, website-initiated light checks. All LED failures are reported to the end user in real-time. All drop and hook activities are logged with a time and location stamp on a web-interface and the tractor's power coil voltage is displayed on the user dashboard.

Figure 14A:
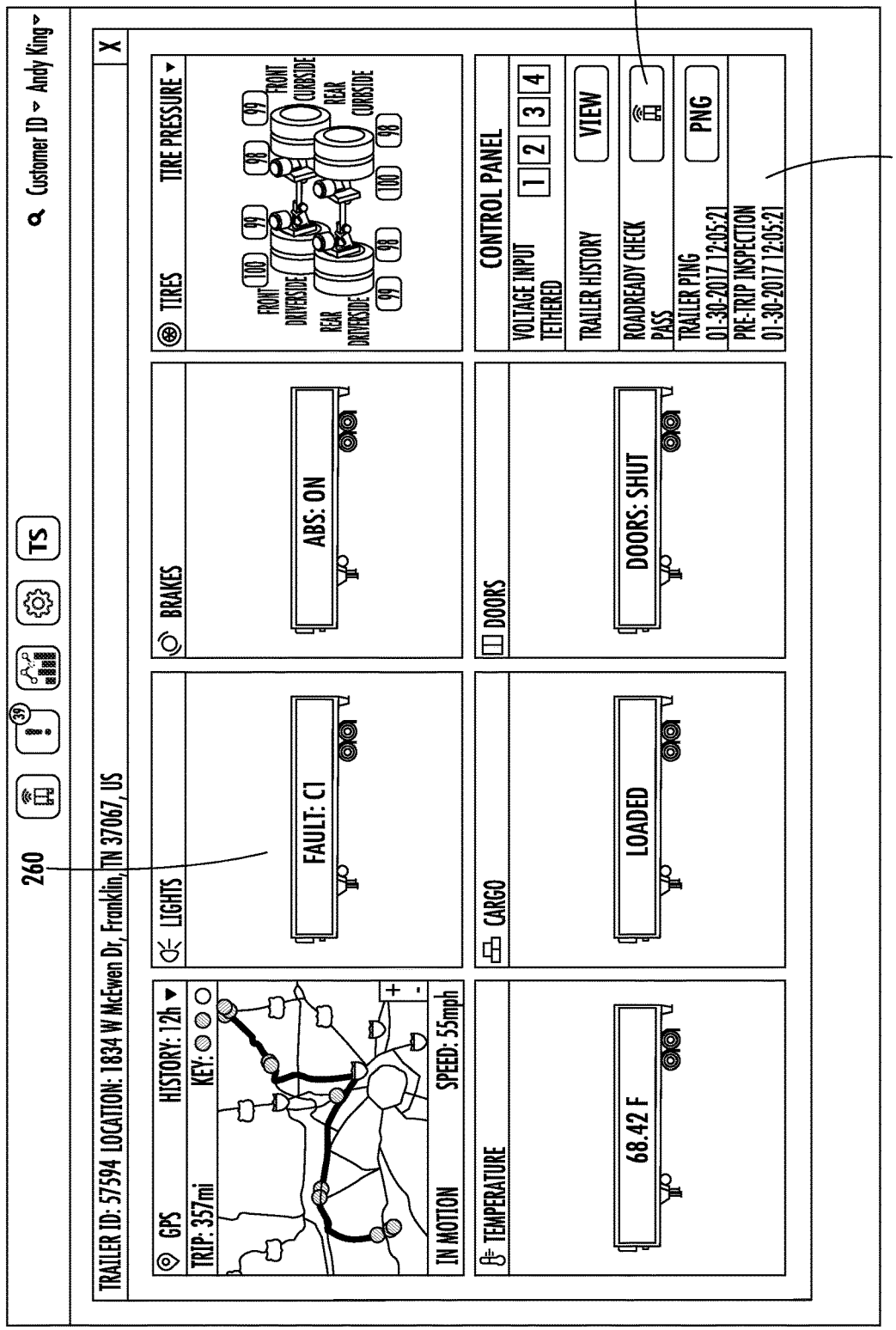
Figure 14B:
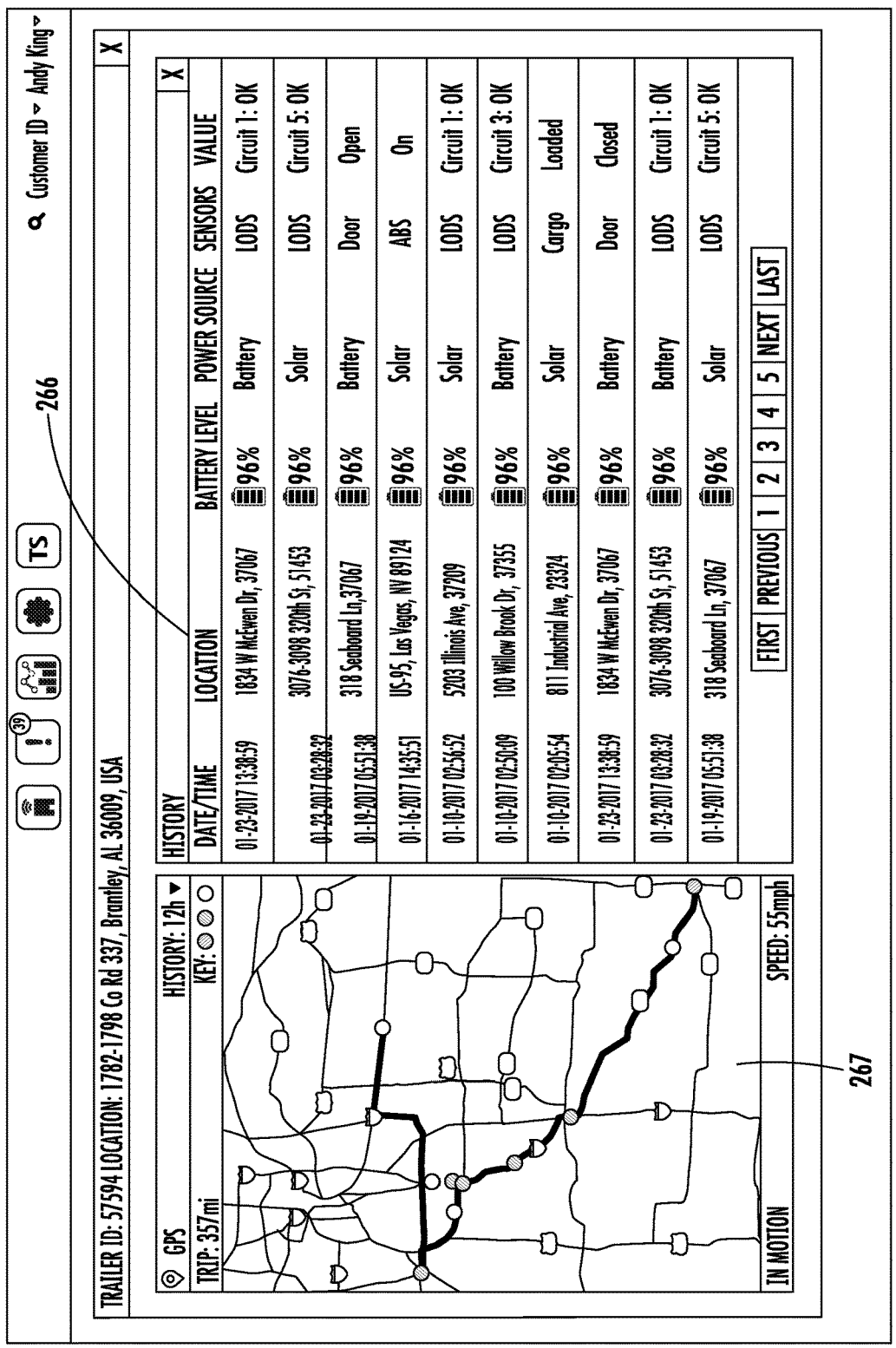

FIGS. 14A-14C are screen shots from a user interface. FIG. 14A is a trailer dashboard overview screen showing a light failure fault at 260. A trip check can be initiated by clicking an icon 262. A timestamp of physical pre-trip at trailer location is also indicated at 265. FIG. 14B is a screenshot showing a time stamp history and location of light failure detection system alerts 266. A map view 267 of the listed items is also provided. FIG. 14C is an overview screen of light failure detection system alerts from multiple trailers. The trailer ID is provided, along the time, location, power source and alert type (i.e. fault circuit).

Detailed circuit diagrams of the light failure detection system is shown in FIGS. 15A-15I. The connection to the blue circuit is shown as well as elements to provide filtering, to provide 3.3V and 3.0V regulated voltages, and to provides charge voltage to battery.

Figure 15A:
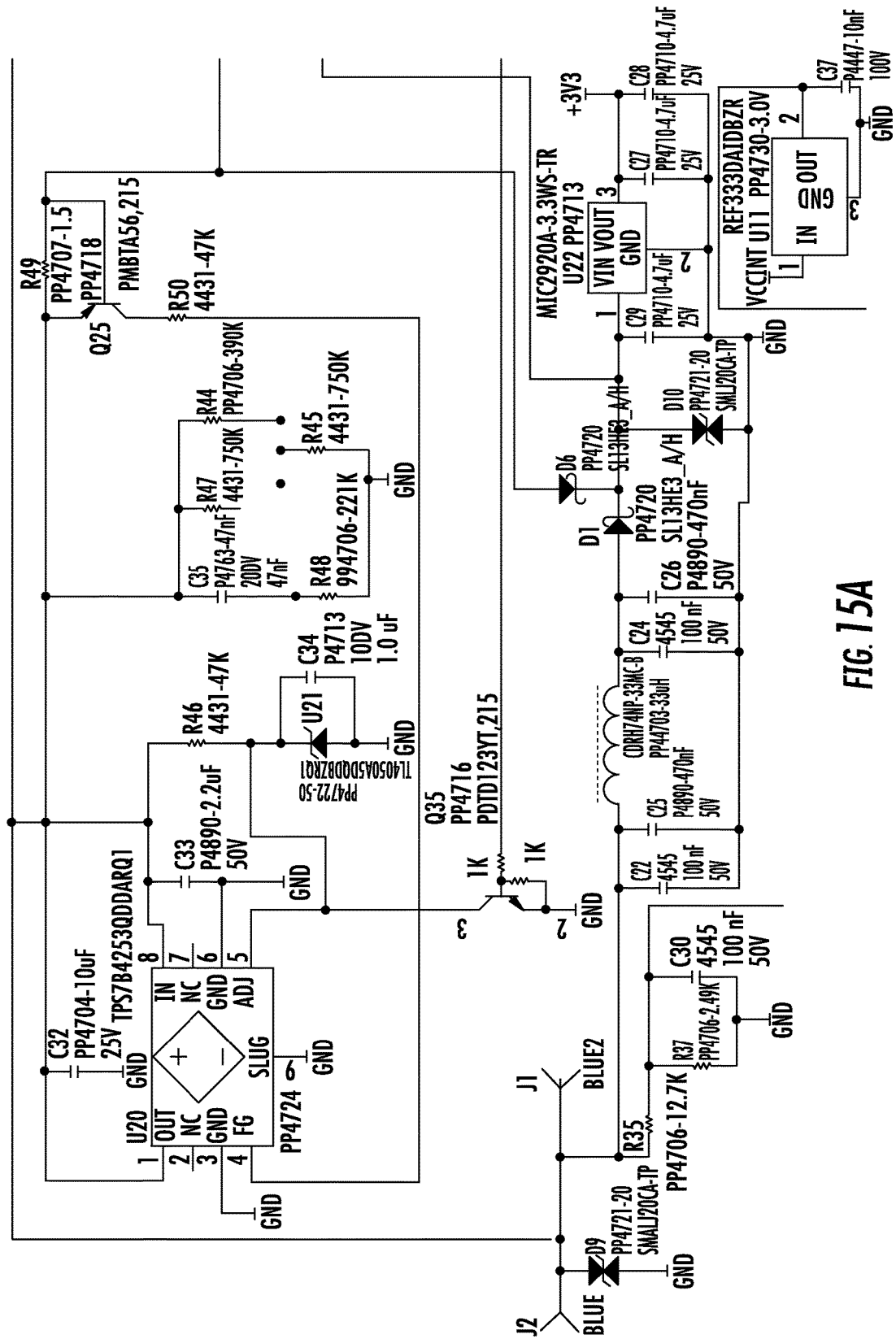
FIGS. 15A-15I are detailed circuit diagrams of the light failure detection system.
Figure 15B:
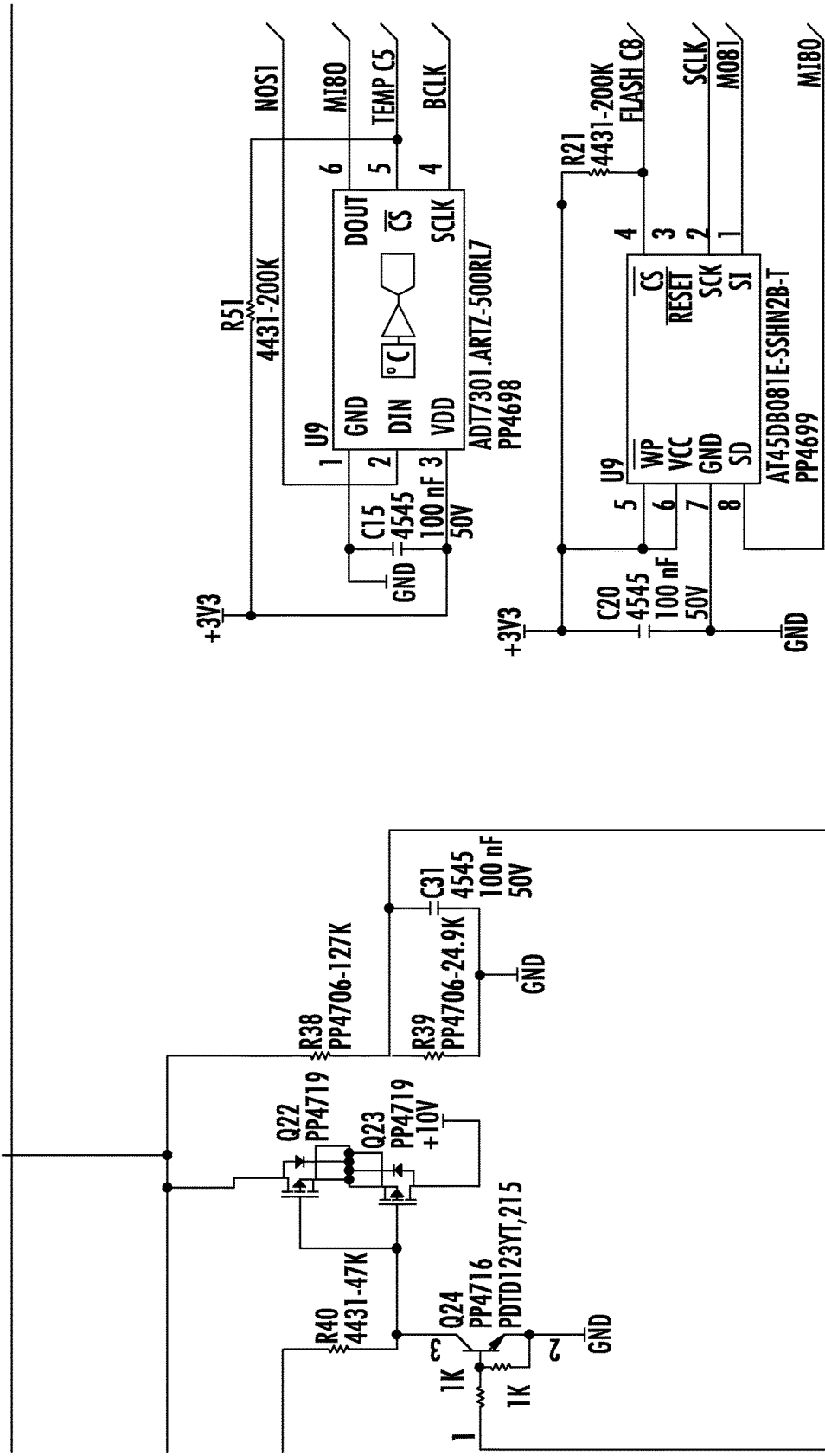
Figure 15C:
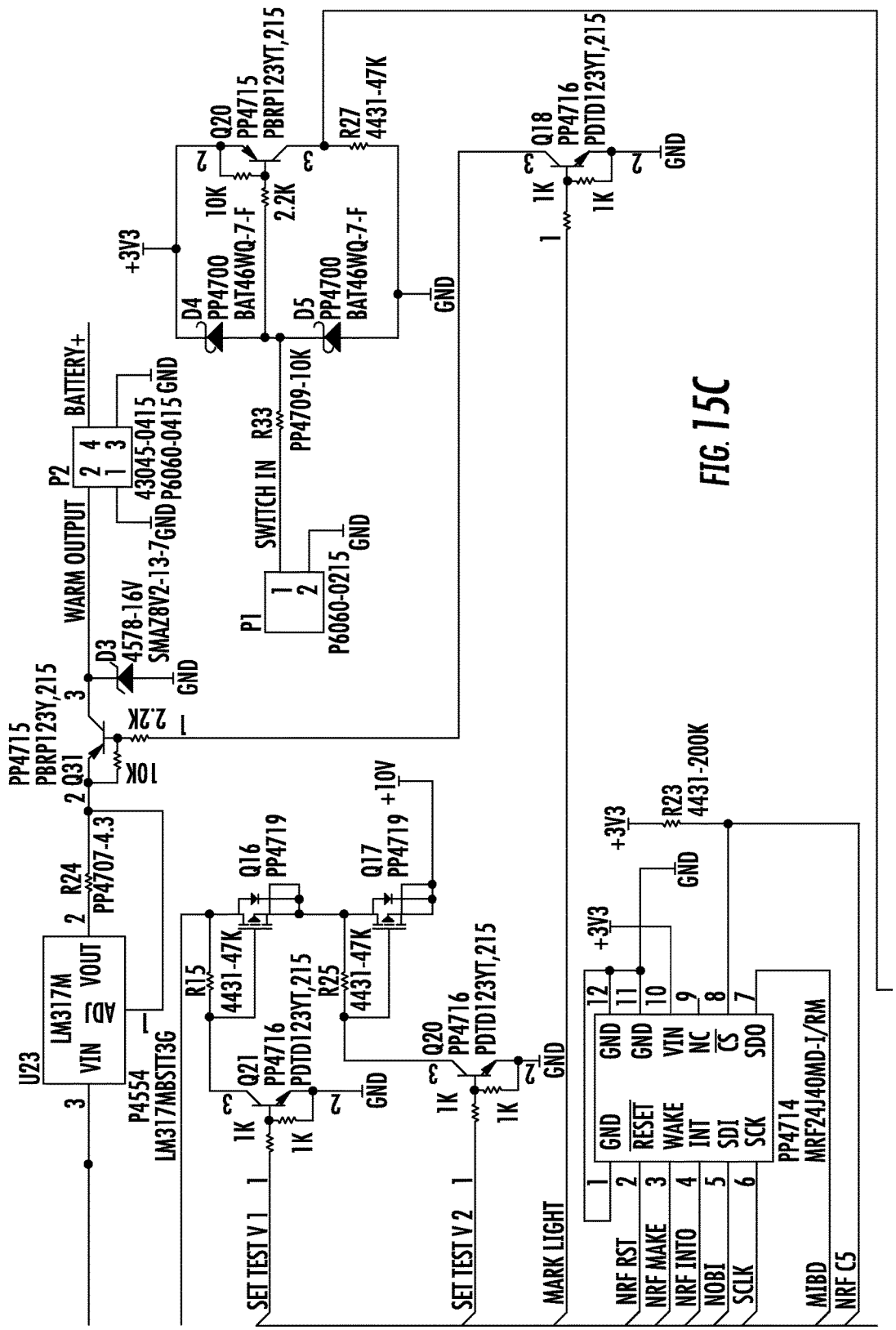
Figure 15D:
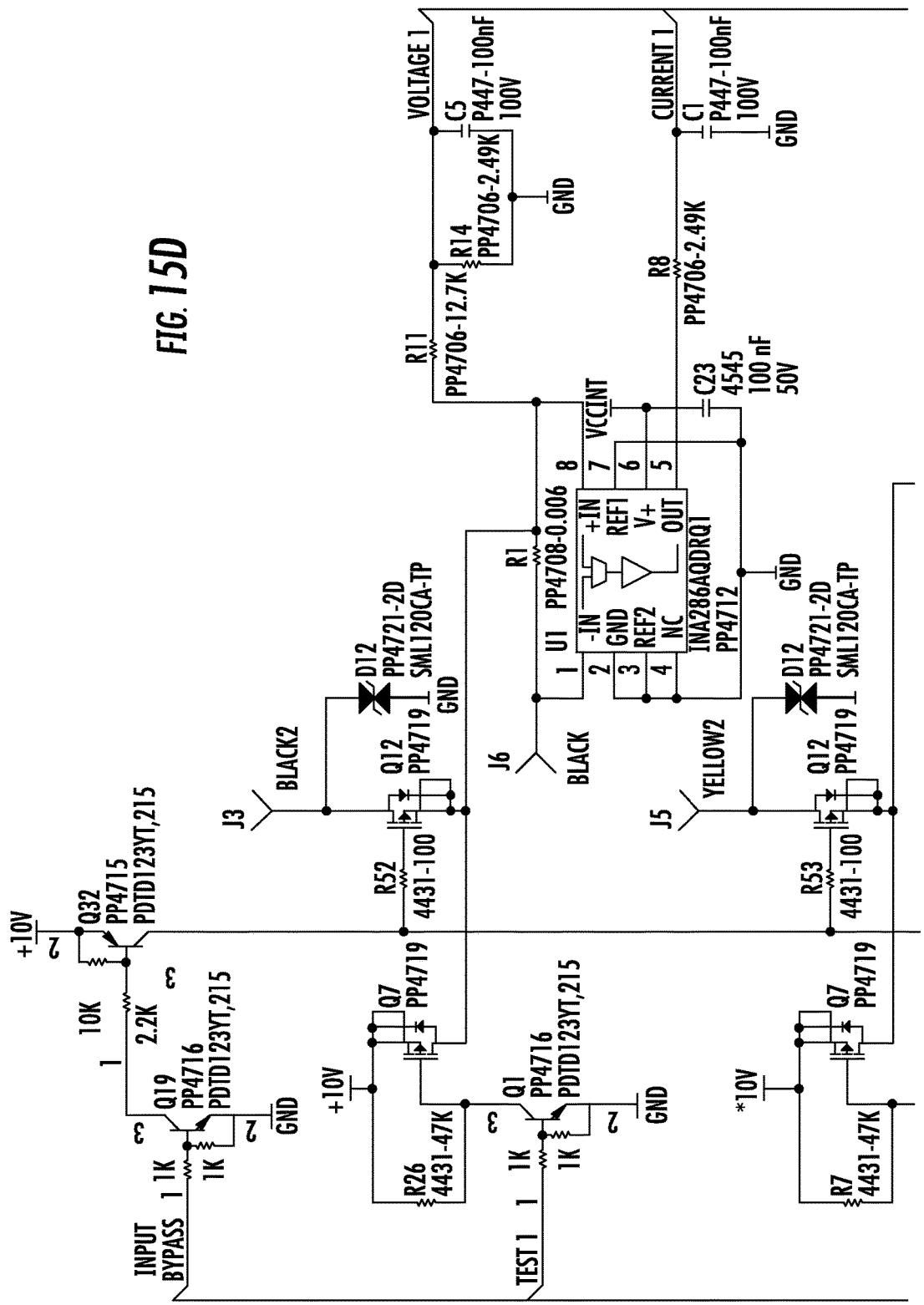
Figure 15E:
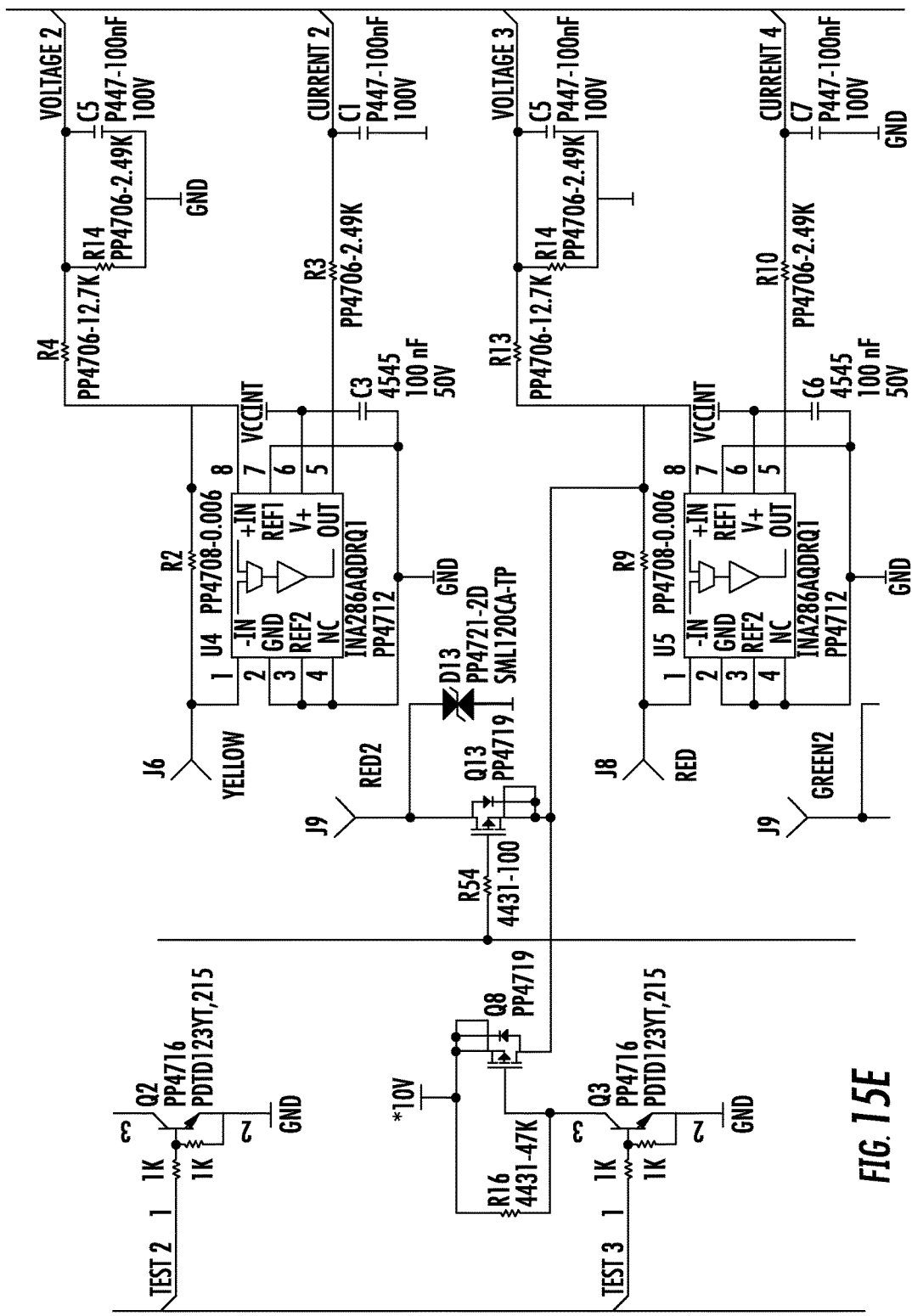
Figure 15F:
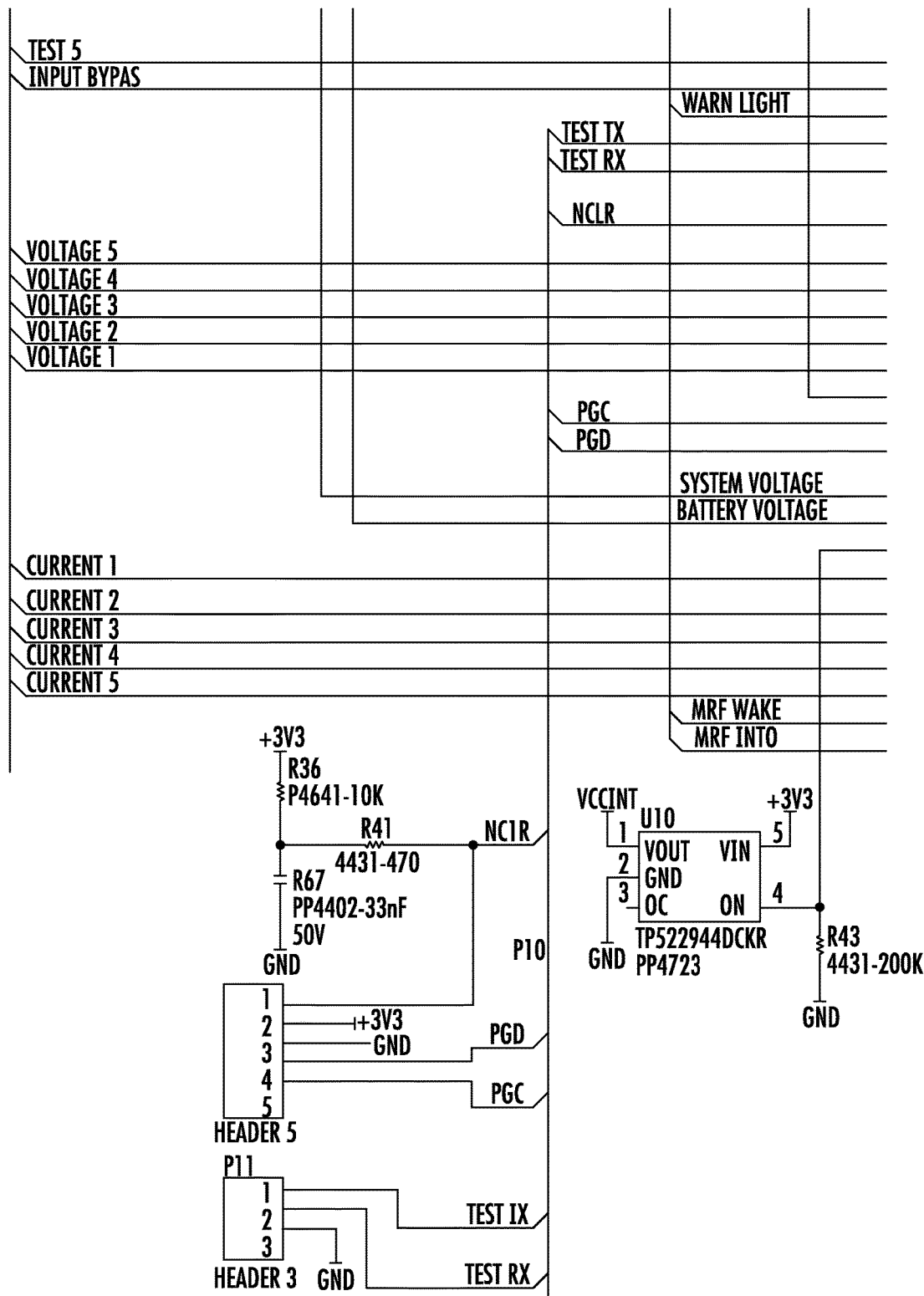
Figure 15G:
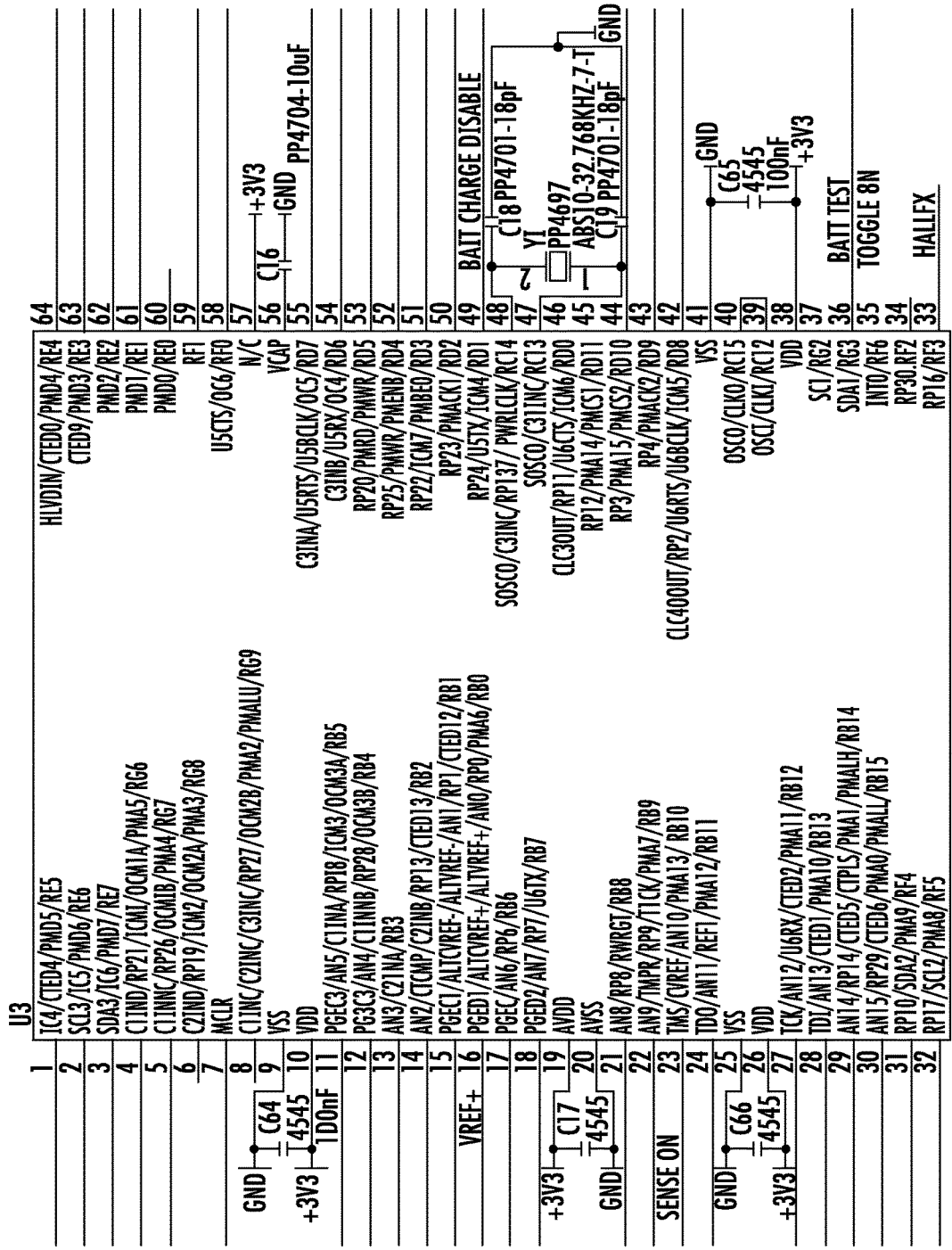
Figure 15H:
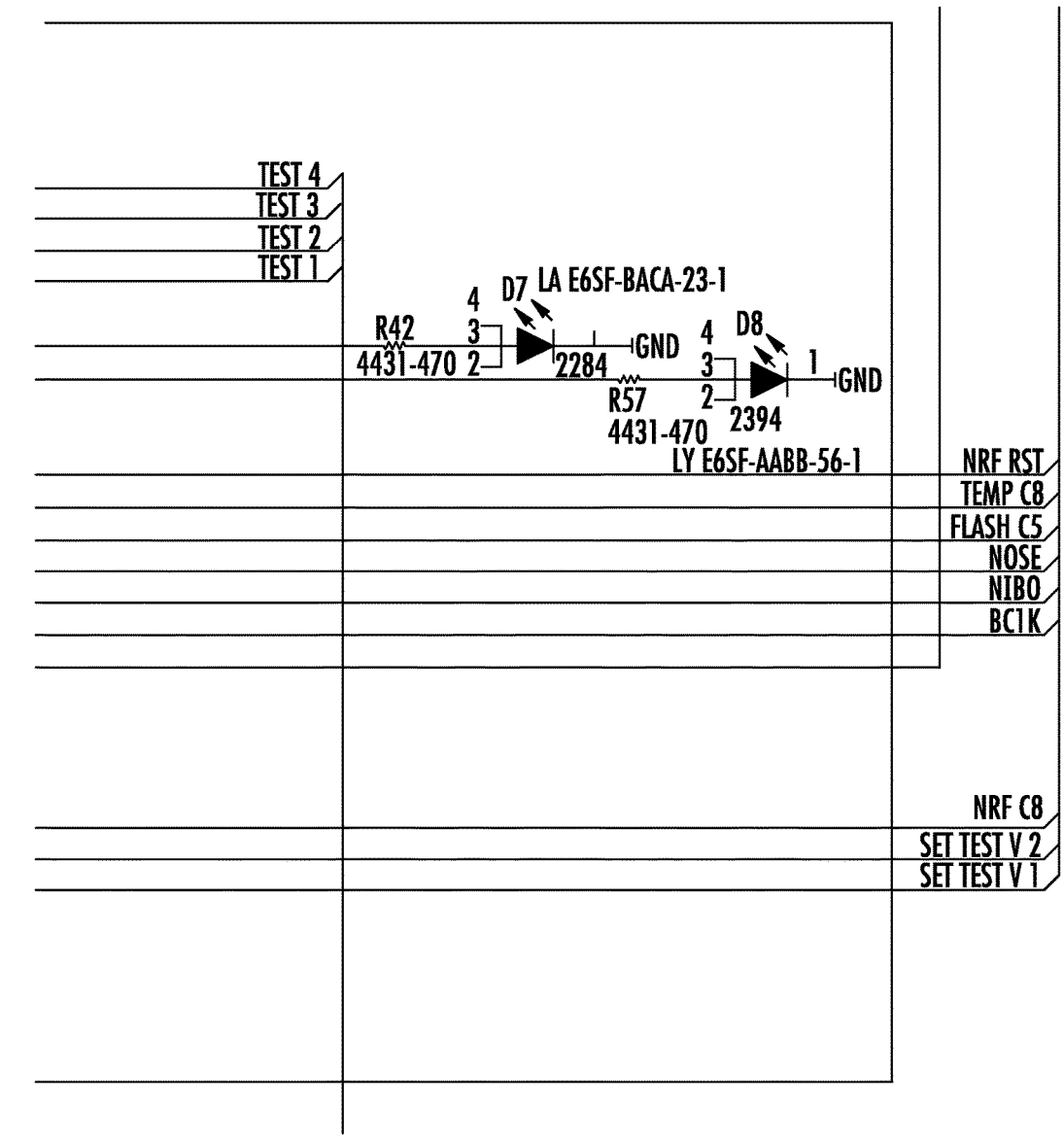
Figure 15H:
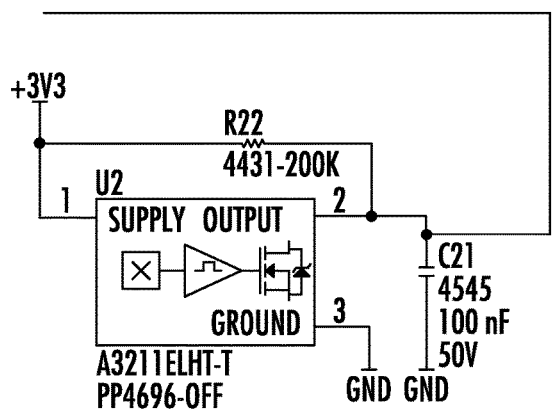
Figure 15I:
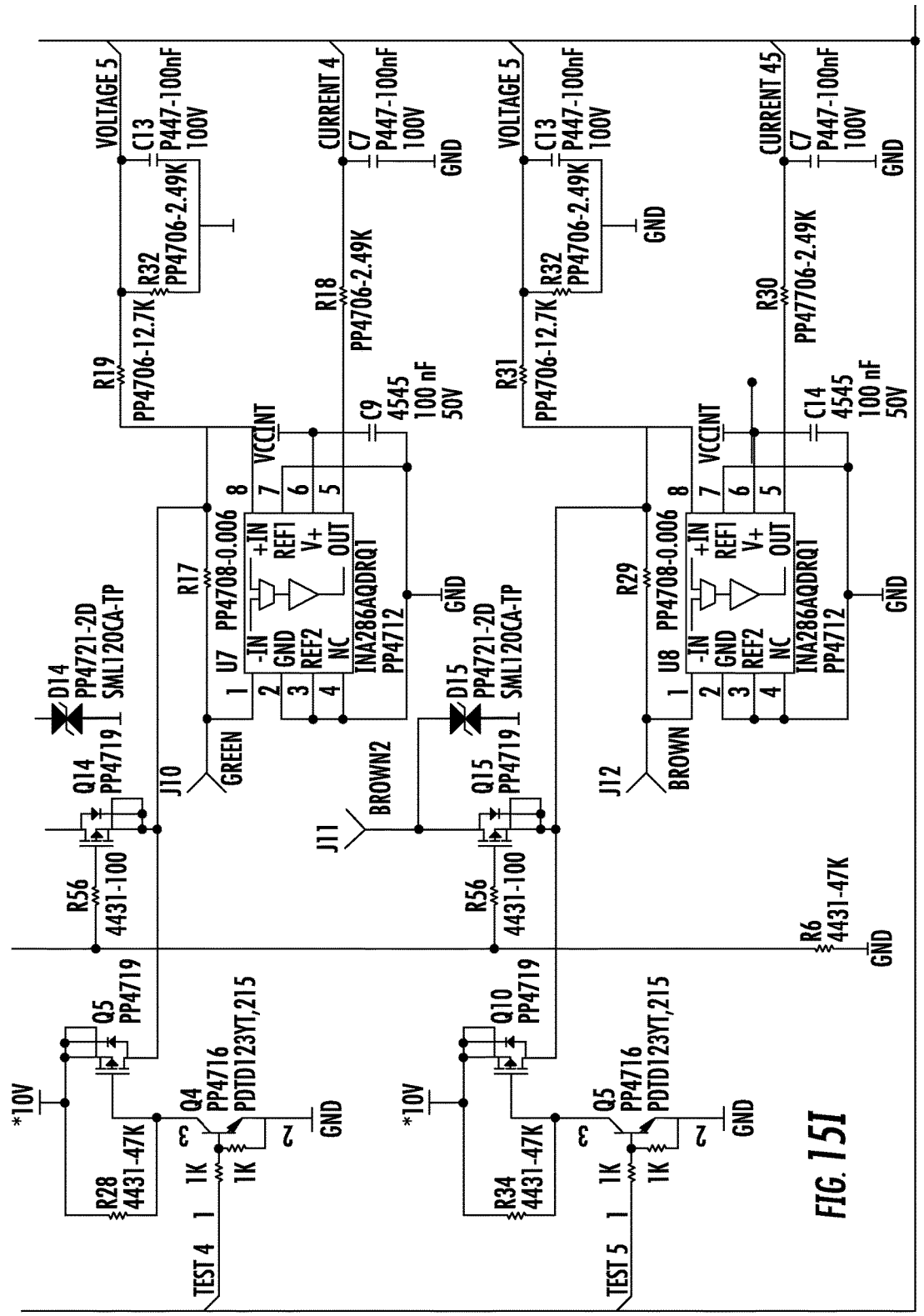

FIG. 15B illustrates temperature sensor (PP4698) and extra memory for microcontroller (PP4699). Q22 and Q23 provide a switch function to provide 10V when the LODS is testing the loads. FIG. 15C includes P4554 for providing a current limit to switch PP4715 to activate the indicator light. P6060-0215 is an external input (user activated) and signal conditioning is provided. FIGS. 15D, 15E and 15I monitor the current loads for errors (current and voltage). Also provided through the input bypass is a way to disconnect the loads for calibration. Calibration uses TEST1-TEST5 to cycle power to each load and measure at temperature to attain a reference point after installation or a repair is made. FIG. 15F includes PP4723 to provide a switched 3.3V to allow reduction of current in non-operation mode. Headers provide diagnostic and programming interfaces for use in production. FIG. 15G illustrates the main controller. FIG. 15H shows magnetic sensor PP4696-OFF used to put the LODS in a special mode to learn new absolute limits and to prevent a user from intentionally teaching an excessive condition like short circuit or open circuit.

Light failure detection system 210 communicates with master control unit 250, which includes solar cells and an electronics module, which are integrated into a one-piece unit. The solar cells convert light energy, such as from the sun, into power for operation of the electronics module. A local wireless network master transceiver module of master control unit 250 comprises the master node in a local wireless network with the wireless sensors. An exemplary wireless network uses the hardware specified by IEEE standard 802.15.4 coupled with a proprietary communication protocol. The local wireless network allows sensor data from wireless sensors in the network to be gathered by the master control unit 250 and transmitted using the cellular data transceiver module of the master control unit 250. Examples of master control units that may be used with light failure detection system 210 are: 005-197-502—Verizon (CDMA) with internal ZigBee—allows use of additional sensors, such as temp, cargo, door, and fuel sensors; 005-197-501—AT&T (GSM) with internal ZigBee—allows use of additional sensors, such as temp, cargo, door, and fuel sensors; 005-198-502—Verizon (CDMA) without internal ZigBee—tracking only, no additional sensors; 005-198-501—AT&T (GSM) without internal ZigBee—tracking only, no additional sensors.

Figure 16A:
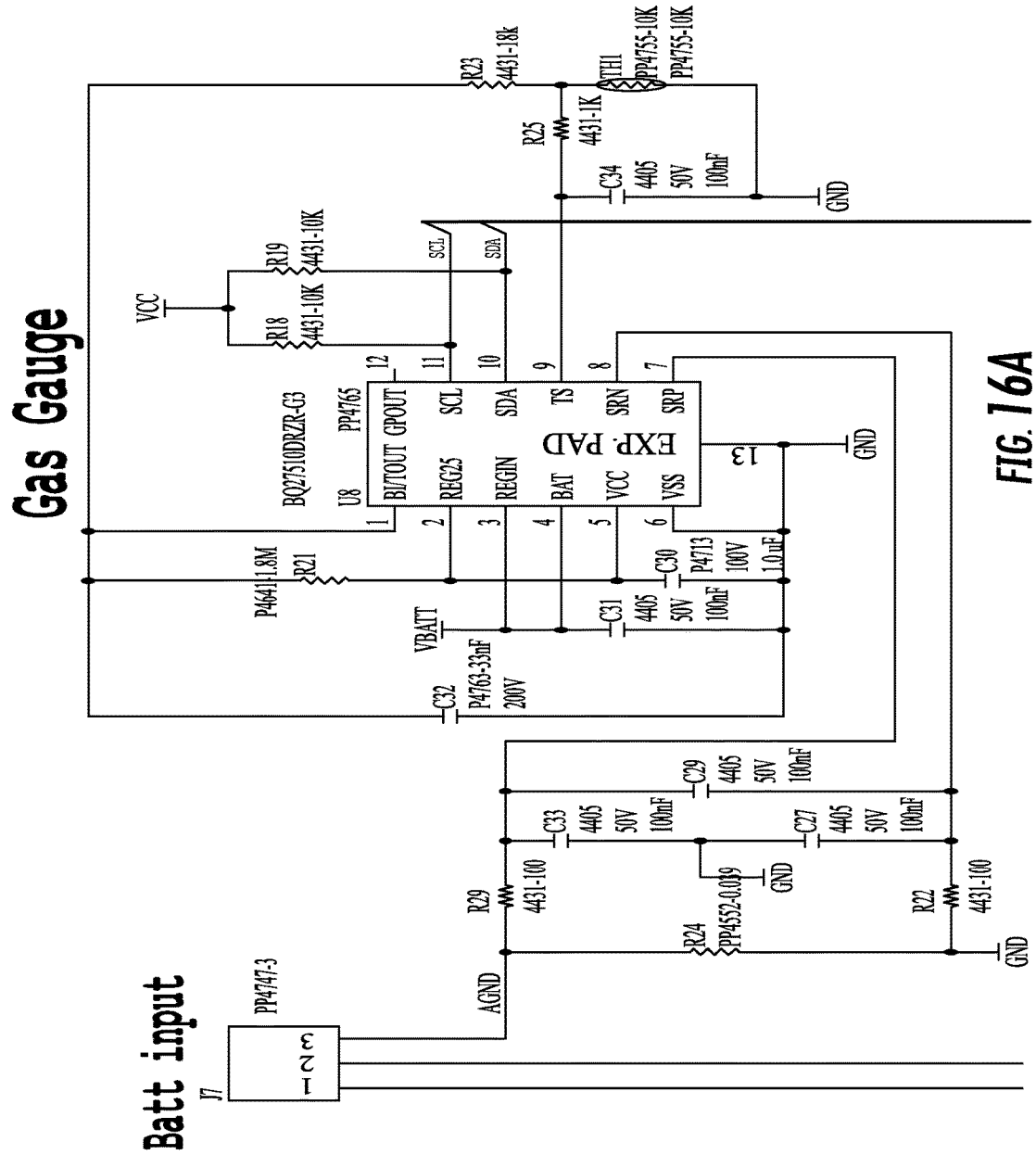
FIGS. 16A-16M detailed circuit diagrams of the master control unit.
Figure 16B:
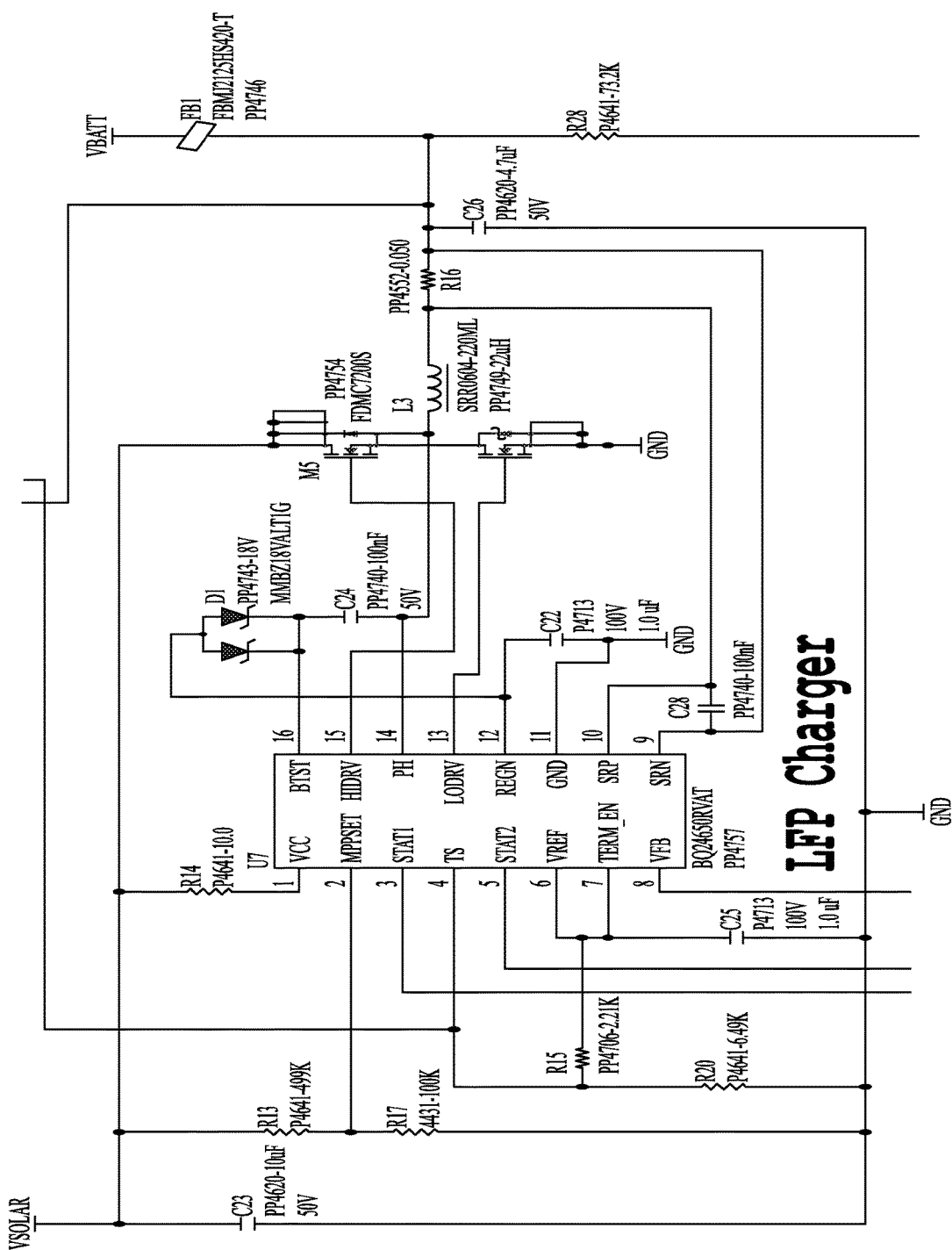
Figure 16C:
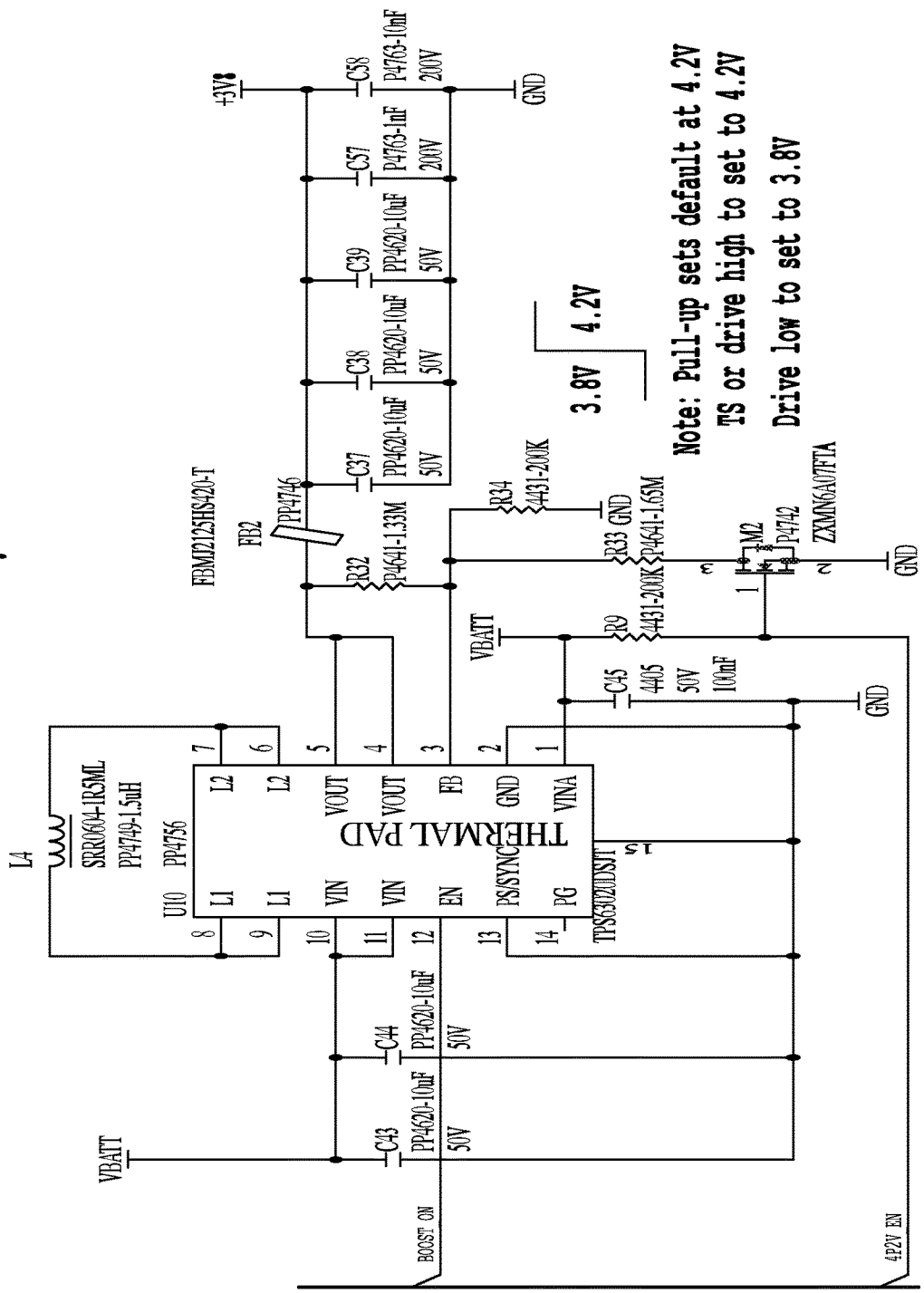
Figure 16D:
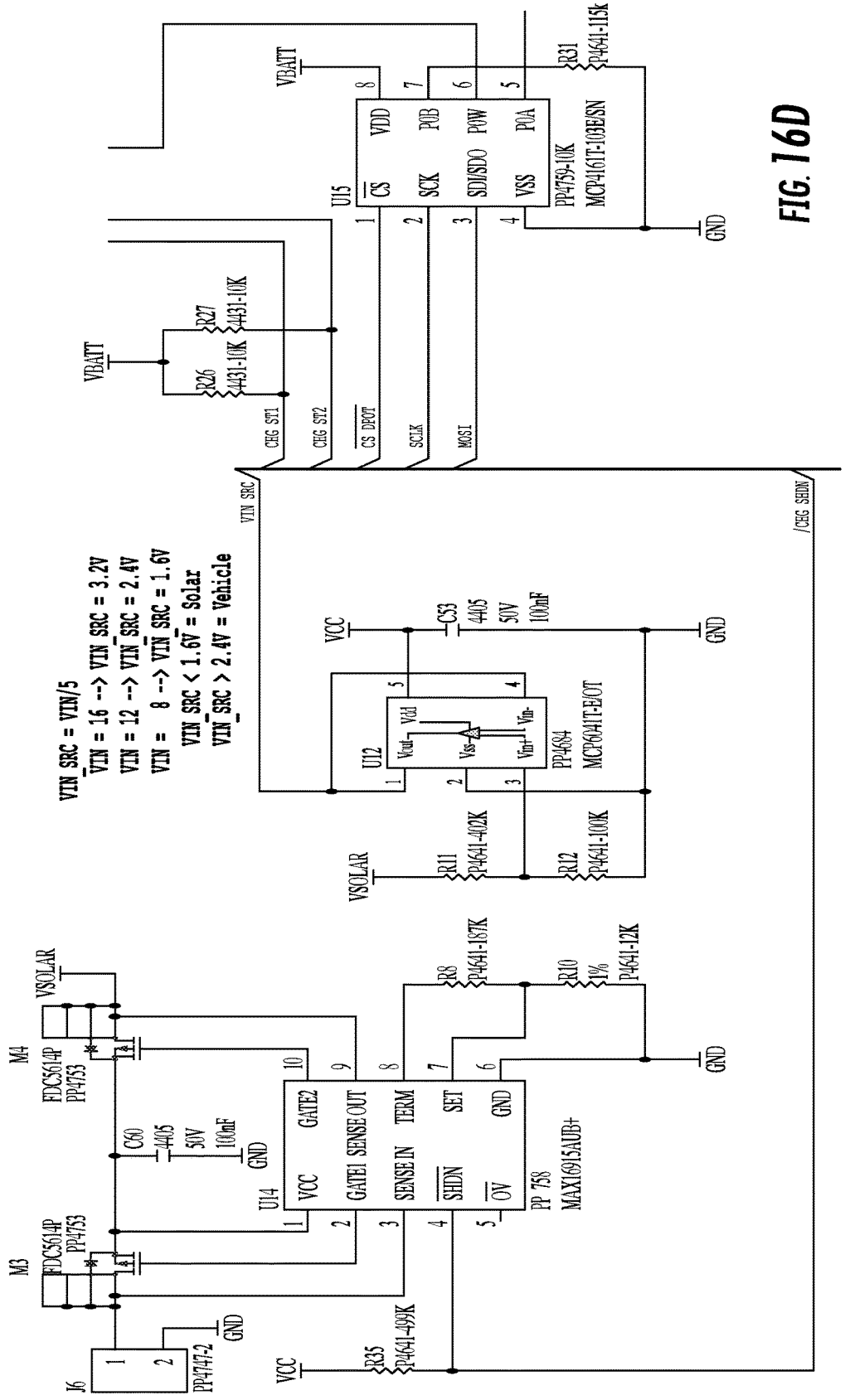
Figure 16E:
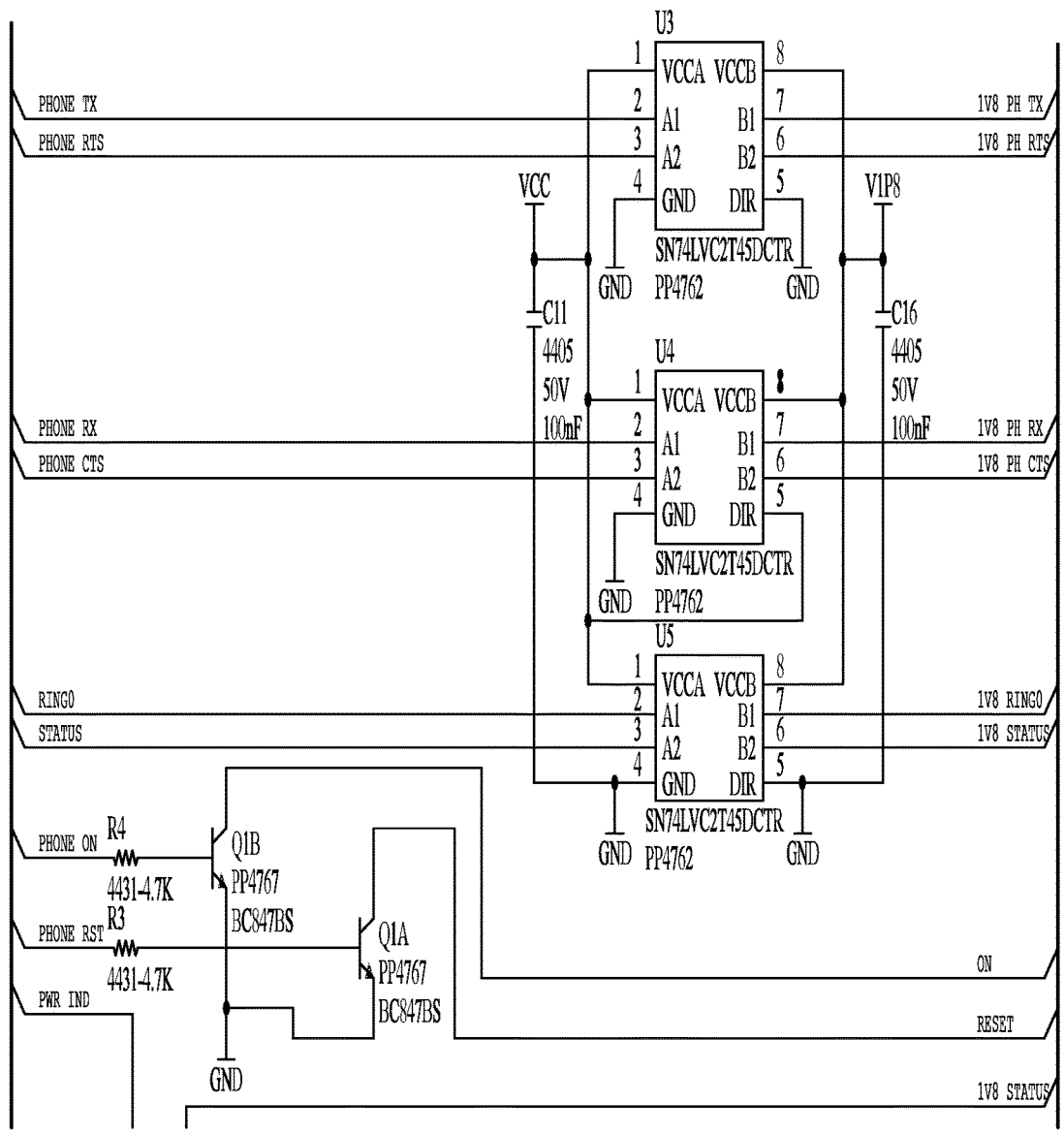
Figure 16F:
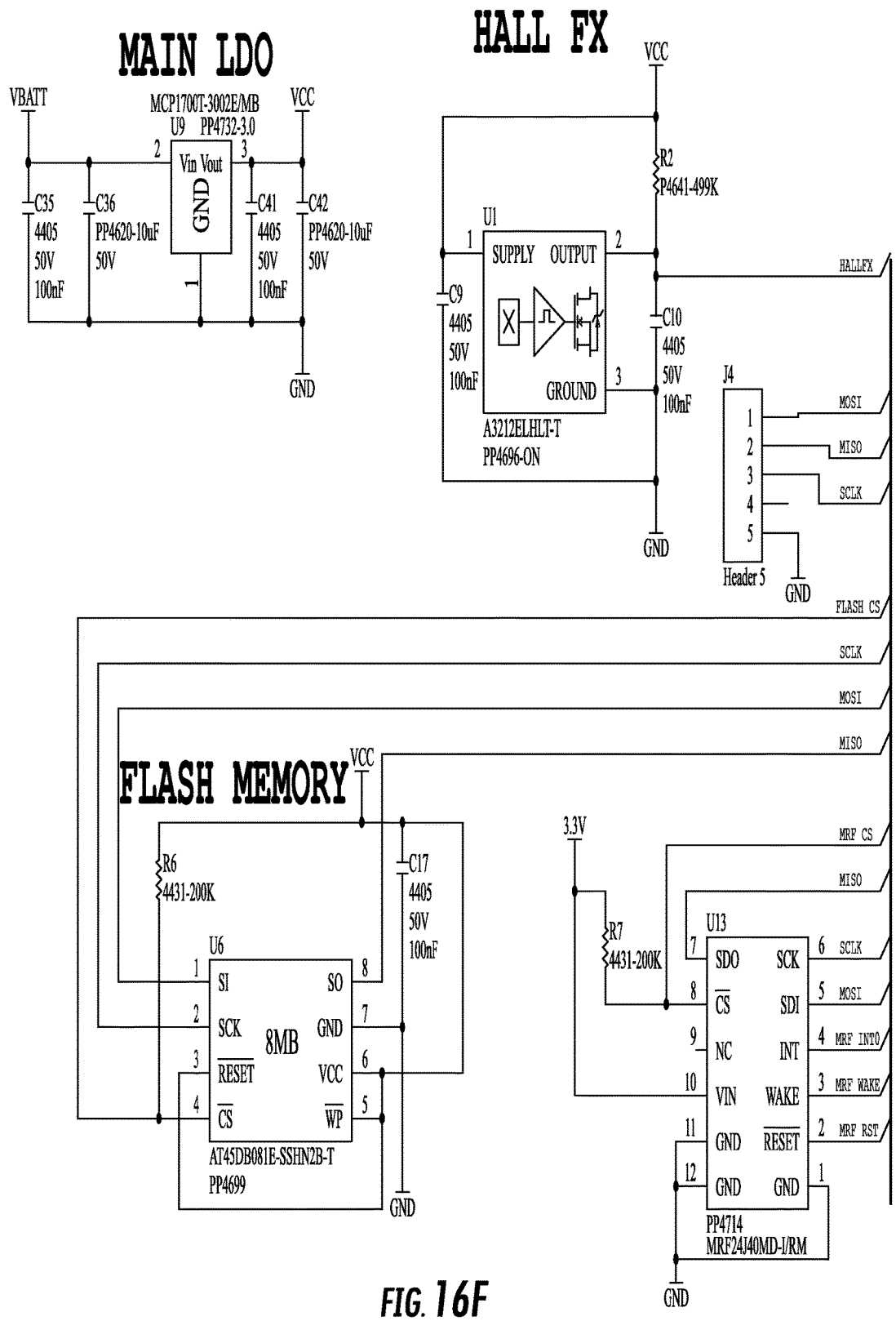
Figure 16G:
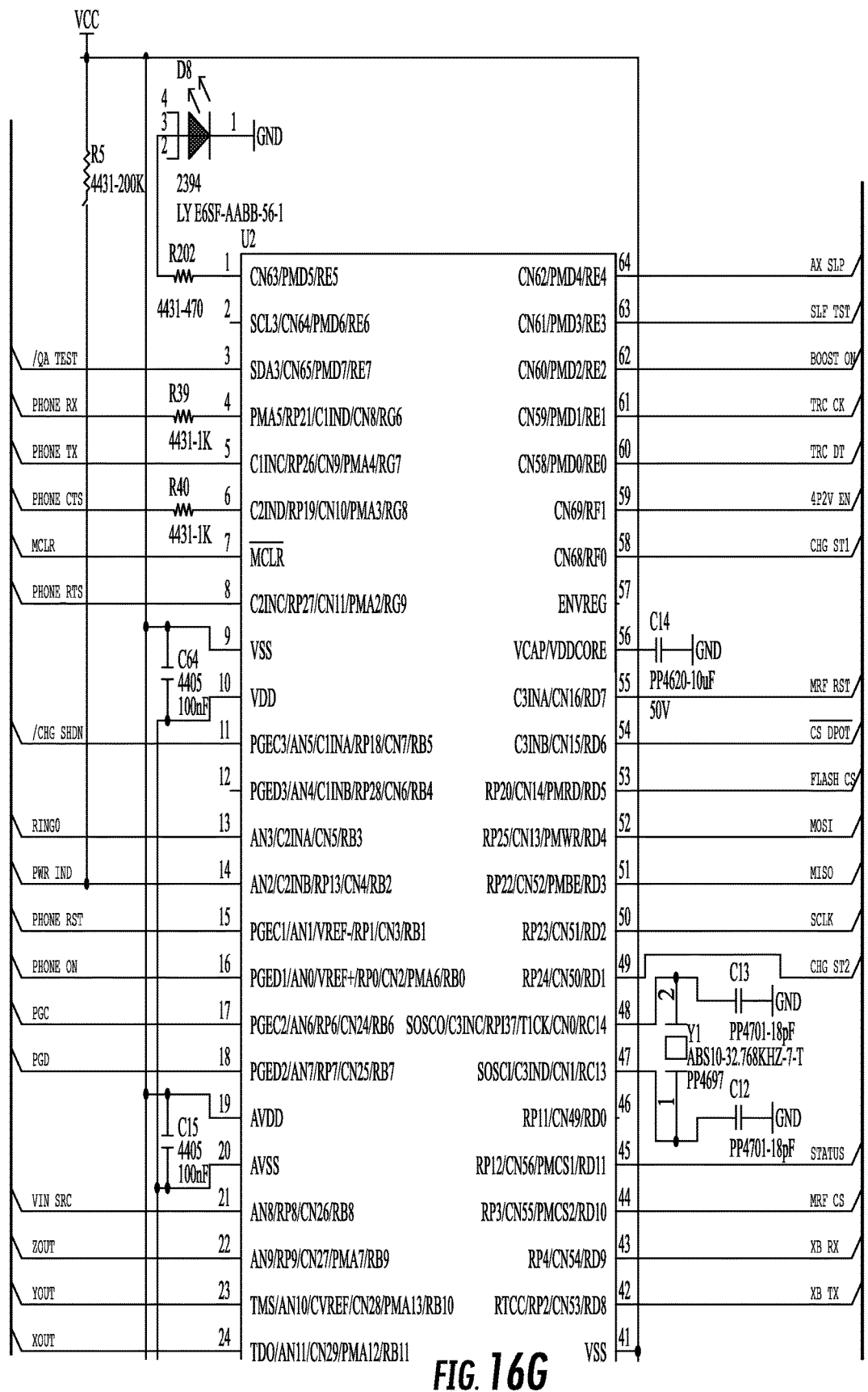
Figure 16H:
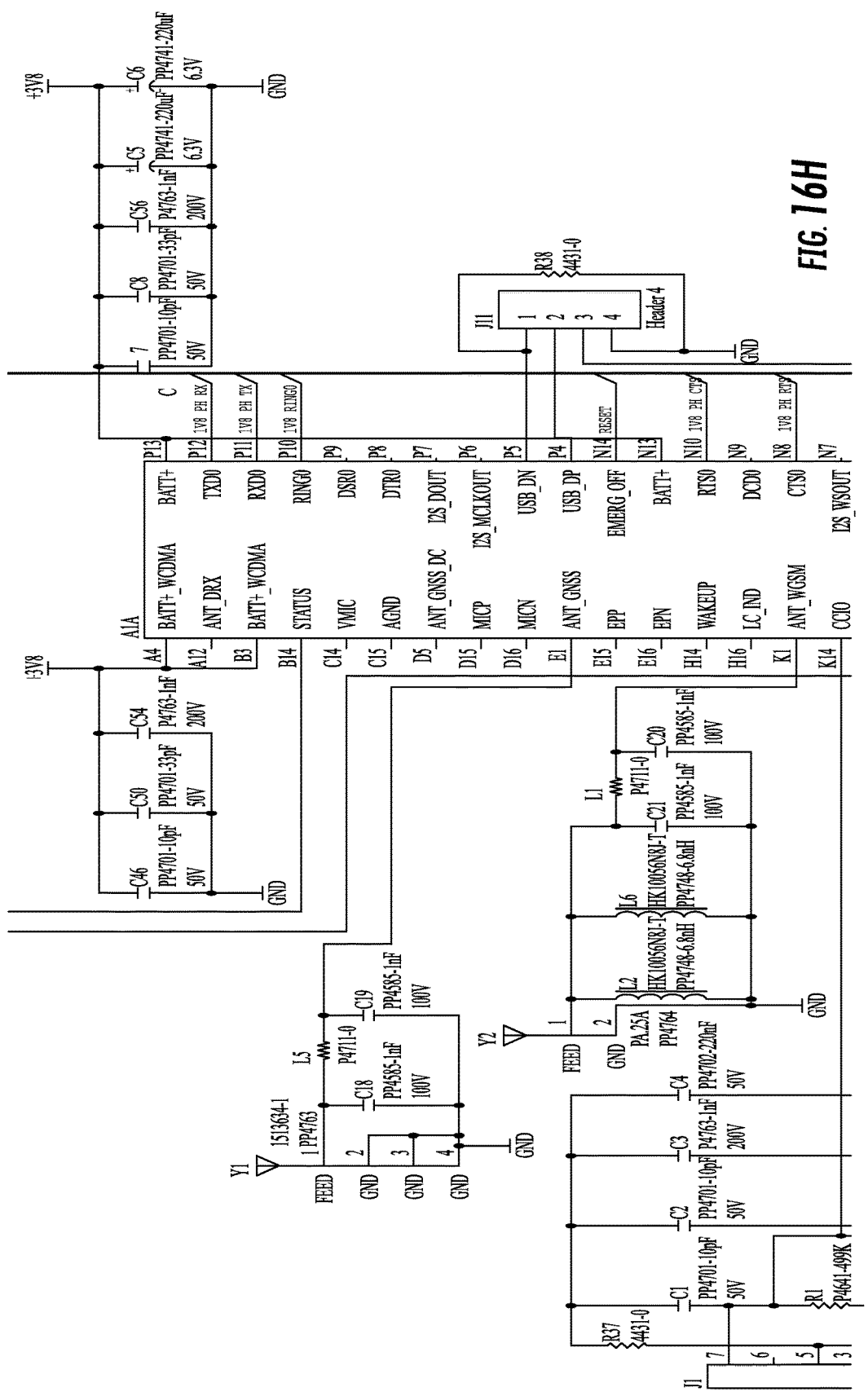
Figure 16I:
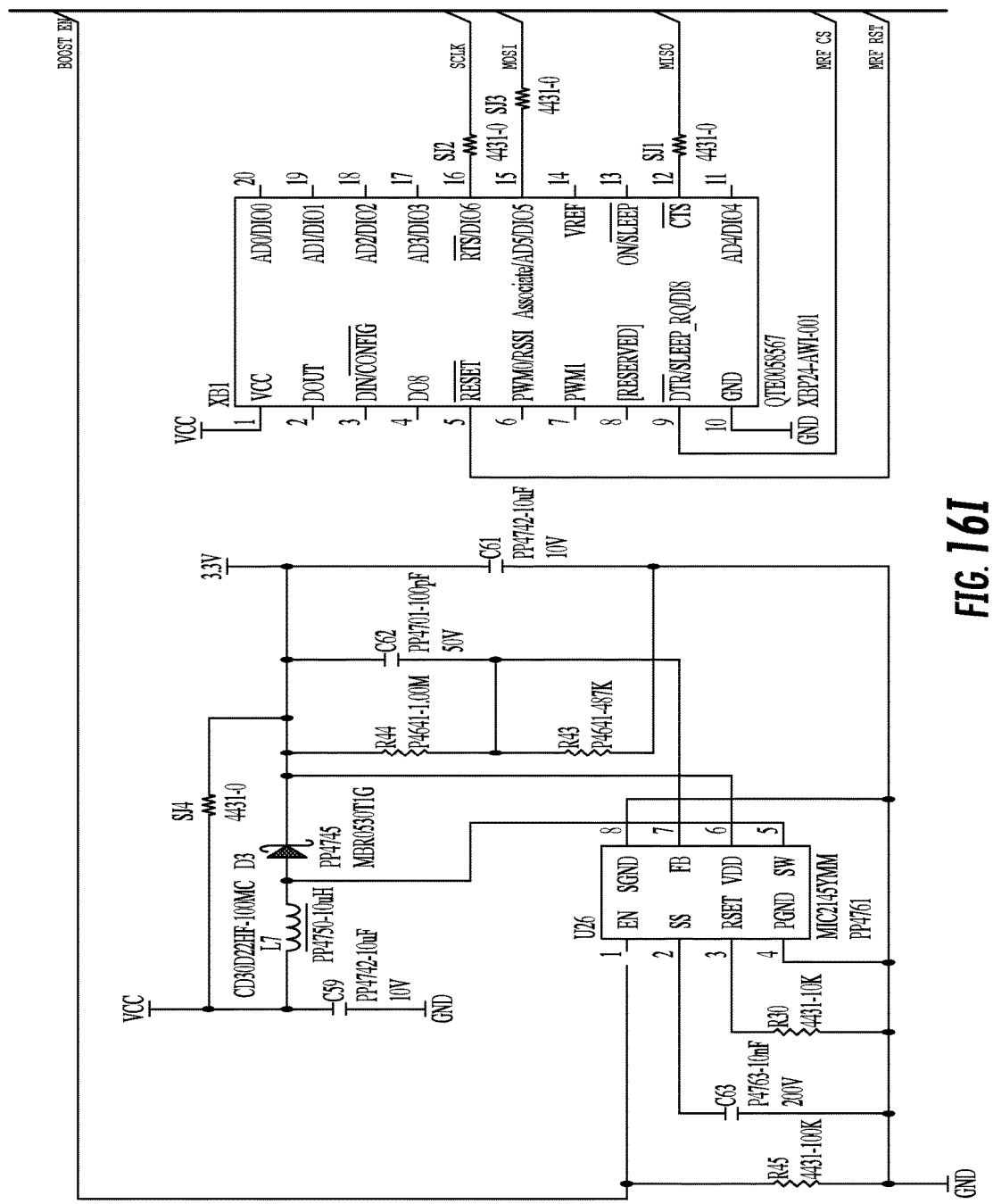
Figure 16J:
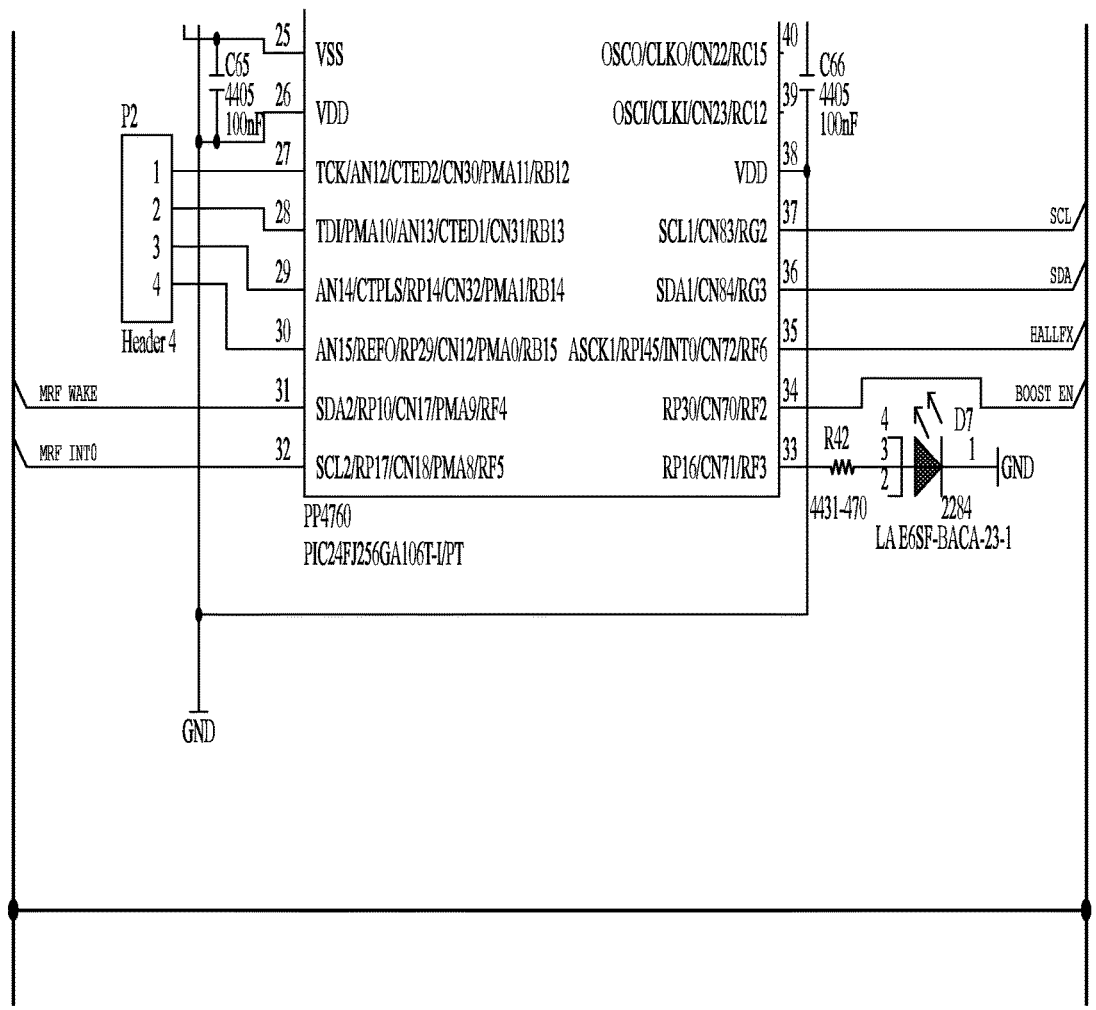
Figure 16K:
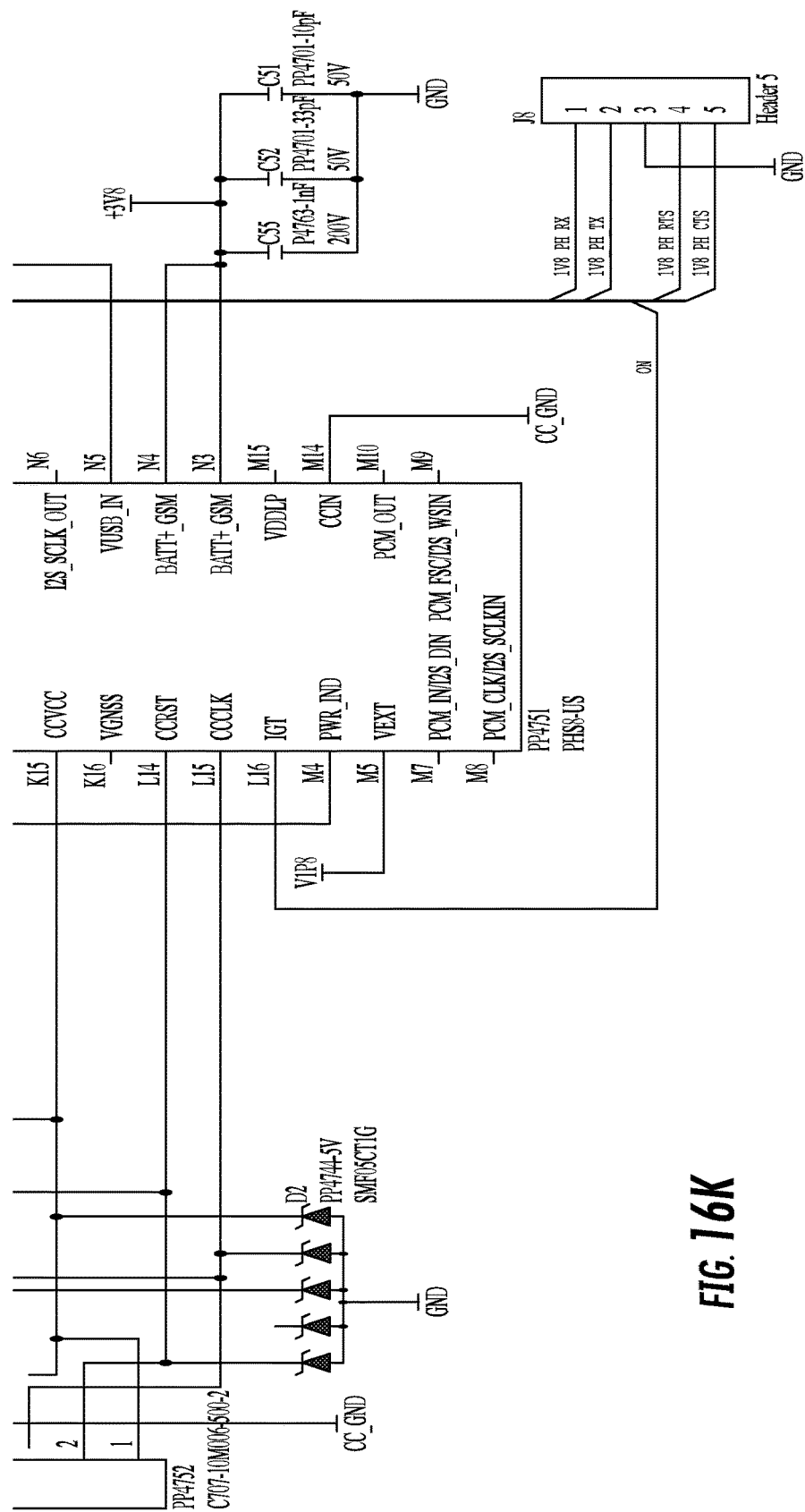
Figure 16L:
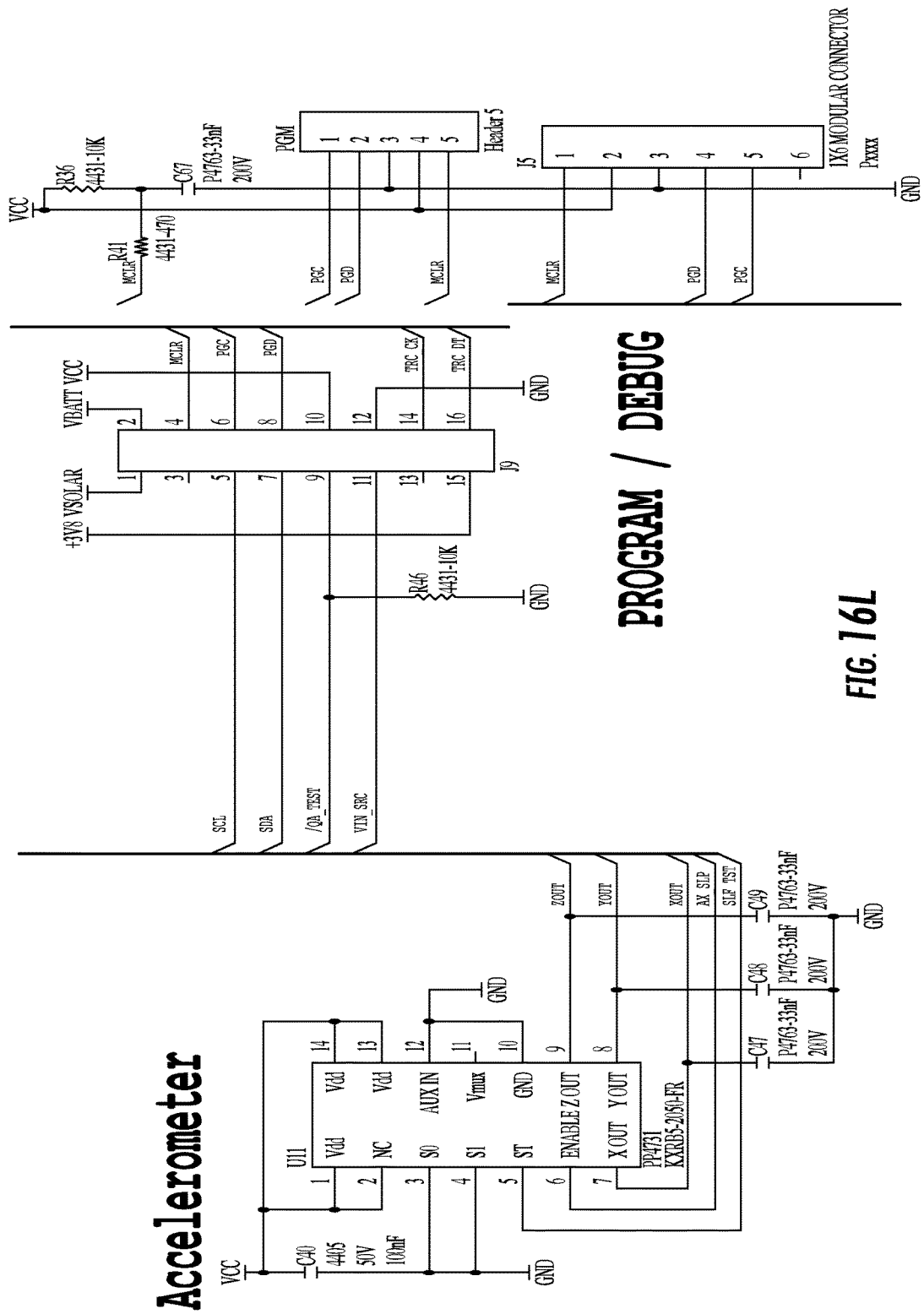
Figure 16M:
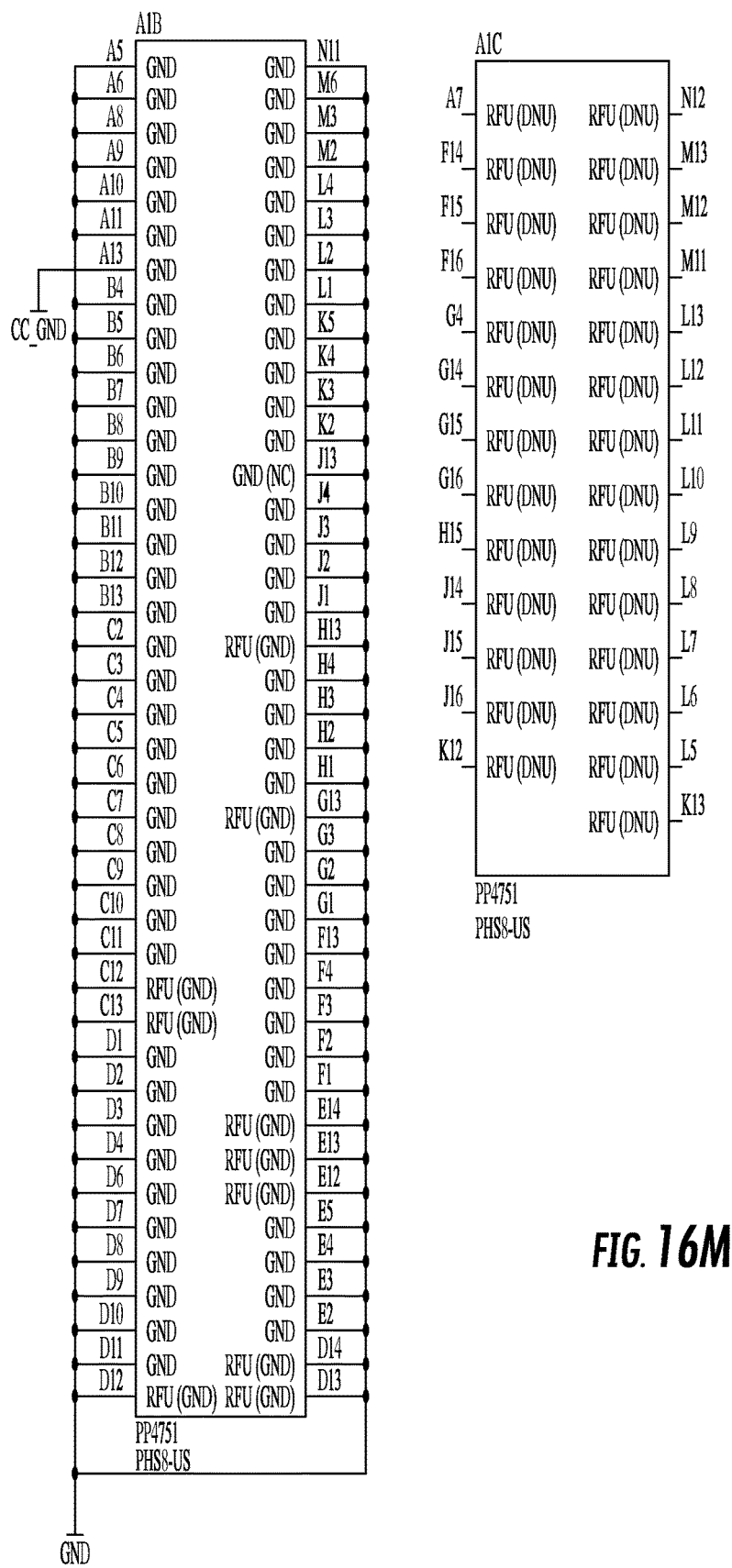

Detailed circuit diagrams of the MCU is shown in FIGS. 16A-16M. FIG. 16A illustrates a "Gas Gage" circuit to monitor battery charge. FIG. 16B shows a charger circuit that takes solar panel power and uses it to charge the battery. FIG. 16C illustrates a voltage booster circuit provides a higher voltage for use by a cell network modem. FIG. 12D includes PP4758 to provide 'ideal diode' function, PP4684 is a comparator to detect if solar panel is providing power, and PP4659-10K is a digital potentiometer used to adjust the battery charge voltage. FIG. 16E shows a voltage level translation from the controller to the cell network modem and FIG. 16F includes PP4732-3.0 to provide VCC for the controller and system. PP4696-ON is a magnet sensor use to power on the device when a magnet is present in a specific location, PP4699 is extra memory for the controller, and PP4714 is the IEEE 802.15.4 transceiver used to communicate on the ZigBee network. FIGS. 16G and 16J are the controller and FIGS. 16H and 16K are the cell network modem and related antennae. FIG. 16I includes PP4761 to provide a voltage boost to 3.3V for system use. QTE0058567 is secondary IEEE 802.15.4 transceiver. Further, FIG. 16L includes an accelerometer PP4731 to indicate that the vehicle is moving. The headers are debug, programming interfaces for development and production. FIG. 16M illustrates cell network modem ground connections and no-connect pins.

The Light failure detection system is capable of conveying the following message types: C1 Fault (RED/STOP), C2 Fault (BLK/CLEARANCE), C3 Fault (BRN/MARKER), C4 Fault (YLW/LH TURN), C5 Fault (GRN/RH TURN), C1 Resolved (RED/STOP), C2 Resolved (BLK/CLEARANCE), C3 Resolved (BRN/MARKER), C4 Resolved (YLW/LH TURN), C5 Resolved (GRN/RH TURN), Disconnect message, Connect message, Circuits STATUS, Tractor Voltage (Tethered), Internal Battery Voltage (Un-Tethered), Learn-Pass/Fail (when learn mode is conducted), Inspection (when a pre-trip Walk Around inspection is completed).

Light failure detection system 10 functions when connected or tethered to a tractor or when not connected to a tractor, i.e. untethered. When tethered, the learn mode of light failure detection system 10 may be activated to give a pass or fail reading. The learn mode may be initiated by a simultaneous quick and long hold of toggle or activator switch 85. During the learn mode the light failure detection system learns the trailer's light configuration. If a circuit is energized during the learn mode, the learn mode will fail. A Walk Around pre-trip mode is also preformed when tethered to a tractor. The pre-trip mode is triggered, for example, by one quick click of the toggle switch. The pre-trip mode cycles the exterior lights (5 circuits) for visual check, 30 sec Clearance & Marker, 30 sec Turn Signals (Left, Right), 30 sec Stop Lights. A fault is indicated if a faulted circuit(s) is present. Light failure detection system 10 also includes walk around mode with interrupt which may be triggered manually by one short click of the toggle switch during a Walk Around pre-trip mode. During a walk around mode with interrupt a Walk Around mode is interrupted and substituted with a Trip Check, which is a shorter version of the Walk Around where light failure detection system 10 does a quick light-out or light failure check. During a Trip Check mode while Tethered, light failure detection system 10 is triggered remotely via a trip check command sent through a website user interface. During the trip check mode, a light-out check is performed and the status of all circuits is reported. Additionally, the tractor voltage status is reported with an Alert if the voltage is below a threshold, such as 13.8V. The disconnection or untethering of the tractor from the tractor causes light failure detection system 10 to automatically initiate a trip check. Light failure detection system reports the status of all circuits and indicates if faulted circuit(s) are present. Battery voltage status is provided with an Alert if voltage is below 12V.

When in an untethered state, a trip check mode can be initiated manually, such as by one short click of toggle switch 85. If a faulted circuit is detected, a fault message is sent. If there is NO fault, no message will be sent. The trip check mode may also be triggered remotely by a website user interface when in an untethered state. The status of all circuits and indication of any faulted circuit(s) is provided. The battery voltage status is also provided and an alert is generated if voltage is below 12V.

When a trailer is connected to a tractor a trip check is automatically initiated. The status of all circuits and indication of any faulted circuit(s) is provided. The status of all circuits is also provided and the system indicates if faulted circuit(s) are present. The tractor voltage status is provided with an alert if the voltage is below a threshold, such as 13.8V.

A display mode may be triggered by holding the toggle switch. The indicator light is Illuminated when a fault is present. The light stays ON for 1 min, OFF for 30 mins, ON again for 1 min . . . etc. The indicator light will flash a number of times corresponding to the circuit number that is faulted. For example, the indicator light will flash 2 Flashes (C2—BLK/CLEARANCE), 3 Flashes (C3—BRN/MARKER), 4 Flashes (C4—YLW/LH TURN), and 5 Flashes (C5—GRN/RH TURN). If multiple circuits are faulted, the blue light will flash a number of times during inspection corresponding to the circuit number that is faulted in order of priority. Priority is as follows: Priority 1=C1→1 Flash, Priority 2=C4→4 Flashes, Priority 3=→C5→5 Flashes, Priority 4=C2→2 Flashes, Priority 5=C3→3 Flashes.

A "Deep learn mode" establishes a long-term baseline for a given lighting setup, to prevent user from inadvertently running a learn test with a fault condition. This is initiated via a magnetic switch during initial installation of the system on a specific trailer.

Circuits Status is a status message that indicates the status of each of the five circuits and the source voltage (Tractor input when Tethered or Internal Battery when Un-Tethered). There are several ways to trigger a circuit status: Tethered Trip Check via website, Un-Tethered Trip Check via website, disconnect of tractor power, and Connect to tractor power. When the trailer is untethered, trip Checks (Disconnect, Website, Toggle switch) will only be performed if battery voltage is about 11.5V or greater.

Light failure detection system 10 includes several parameters that are configurable. For example, status (min)—LODS will send a Status message of the last known circuits' status and voltage source, Alert (min)—LODS will send an alert message when a fault is detected, then sends FAULT (Status) messages per set timer, Timer for Wake-Up—LODS will go to sleep and sends a wake-up message at pre-set time to check for messages from MCU, Tethered—Wake-Up message every 1 min, Untethered—Wake-Up message per set timer—Default 2 mins, Active V—Threshold—Voltage threshold for declaring/identifying that a circuit is present (Default setting is 5V), and Lower Current-Thresholds (Current (mA) upper & lower thresholds may be pre-set for each of the five circuits). The lower current thresholds are adjustable over the air. The default settings are as follows:

Circuit Upper/Lower Threshold (in mA)

| | |
|---|---|
| C1 | 100/20 |
| C2 | 100/8 |
| C3 | 100/7 |
| C4 | 100/16 |
| C5 | 100/16 |

The following Table 4 shows the operation of the light failure detection system during a manual operation in a tethered state in the learn mode, walk around mode, and display mode.

TABLE 4

| | | TETHERED Manual Operation | | |
|---|---|---|---|---|
| Learn Mode | Activate | 1 short & 1 long switch toggles | Send Message to MCU w/Status | |
| | Warning light | ON during learn mode (solid) OFF when learn is successfully completed Blinks steadily if learn mode fails | | |
| Walk around mode | Activate | 1 short switch toggle | Send Message to MCU Inspection was conducted & status if fault is present | |
| | $1^{st}$ sequence (30 s) | CLEARANCE (BLK) = Top lights front trailer MARKER (BRN) = Tail (top/bottom) + Side yellow | | |
| | $2^{nd}$ sequence (30 s) | LH (YLW) + RH (GRN) | | |
| | $3^{rd}$ sequence (30 s) | STOP LIGHT (RED) | | |
| Display mode | Fault present | Yes (ON)/No (OFF) | Send Message to MCU on change of circuit Status | |
| | Check faulted circuit | Hold switch | | |
| | 1 Blink | STOP light (RED) | | |
| | 2 Blinks | CLEARANCE (BLK) | | |
| | 3 Blinks | MARKER (BRN) | | |
| | 4 Blinks | LH Turn (YLW) | | |
| | 5 Blinks | RH Turn (GRN) | | |

The following Table 5 shows the operation of the light failure detection system when connected to a truck tractor in a tethered state in the trip check mode and display mode.

TABLE 5

| | | TETHERED When Trailer First Connected to Truck | | |
|---|---|---|---|---|
| | Check Input Voltage | Input voltage supplied from Truck to Nose Box | Send Message to MCU w/Status | |
| Trip check mode | Auto Pre-Trip check | $1^{st}$ sequence | STOP LIGHT (RED) | |
| | | $2^{nd}$ sequence | CLEARANCE (BLK) = Top lights front trailer | |
| | | $3^{rd}$ sequence | MARKER (BRN) = Tail (top/bottom) + Side yellow | |
| | | 4th sequence | LH (YLW) | |
| | | 5th sequence | RH (GRN) | |
| Display mode | | Fault present | Yes (ON)/No (OFF) | Send Message to MCU w/Status |
| | | Check faulted circuit | Hold switch | |
| | | 1 Blink | STOP light (RED) | |
| | | 2 Blinks | CLEARANCE (BLK) | |
| | | 3 Blinks | MARKER (BRN) | |
| | | 4 Blinks | LH Turn (YLW) | |
| | | 5 Blinks | RH Turn (GRN) | |

The following Table 6 shows the operation of the light failure detection system when in a tethered state in the trip check mode and display mode, when initiated via a user interface.

TABLE 6

| | | Initiated via User Interface | | |
|---|---|---|---|---|
| | Check Input Voltage | Voltage supplied from Truck to Nose Box | Send Message to MCU w/Status | |
| Trip check mode | Trip check | $1^{st}$ sequence | STOP LIGHT (RED) | |
| | | $2^{nd}$ sequence | CLEARANCE (BLK) = Top lights front trailer | |
| | | $3^{rd}$ sequence | MARKER (BRN) = Tail (top/bottom) + Side yellow | |
| | | 4th sequence | LH (YLW) | |
| | | 5th sequence | RH (GRN) | |

TABLE 6-continued

| Display mode | Fault present | Yes (ON)/No (OFF) | Send Message to MCU w/Status |
|---|---|---|---|
| | 1 Blink | STOP light (RED) | |
| | 2 Blinks | CLEARANCE (BLK) | |
| | 3 Blinks | MARKER (BRN) | |
| | 4 Blinks | LH Turn (YLW) | |
| | 5 Blinks | RH Turn (GRN) | |

The following Table 7 shows the operation of the light failure detection system when in a tethered state in the trip check mode and display mode, when initiated via a user interface.

TABLE 7

| | UN-TETHERED (ON Internal Battery) Initiated via 1) Trailer is Disconnected; 2) User interface; or 3) Switch | | | |
|---|---|---|---|---|
| Trip check | Check Battery Voltage | Internal battery voltage | | Send Message to MCU w/Status |
| | Pre-Trip check (AUTO when Trailer is first disconnected) | 1$^{st}$ sequence | STOP LIGHT (RED) | |
| | | 2$^{nd}$ sequence | CLEARANCE (BLK) = Top lights front trailer | |
| | | 3rd sequence | MARKER (BRN) = Tail (top/bottom) + Side yellow | |
| | | 4th sequence | LH (YLW) | |
| | | 5th sequence | RH (GRN) | |
| Display mode | Fault present | Yes/No | | Send Message to MCU w/Status |
| | Display when initiated by Switch w/o Repeat | STOP light (RED) CLEARANCE (BLK) MARKER (BRN) LH Turn (YLW) RH Turn (GRN) | | |

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A light failure detection system with pre-trip inspection for use in a vehicle having a plurality of light emitting diode lighting devices, said light failure detection system comprising: a circuit board; a plurality of lighting circuits, each lighting circuit being coupled to the circuit board by an input wire; a plurality of voltage level monitoring circuits on said circuit board, each one of said plurality of voltage level monitoring circuits connected to one of said lighting circuits and adapted to measure the voltage of the one of said light circuits; a plurality of current monitoring circuits on said circuit board, each one of said plurality of current monitoring circuits connected to one of said lighting circuits and adapted to measure a current draw of the one of said light circuits; a voltage drop circuit for enabling the plurality of voltage level monitoring circuits and the plurality of current monitoring circuits to measure current and voltage at an adjusted input voltage; a temperature sensor for sensing a temperature; a switch for placing the light failure detection system into a learn mode wherein said lighting circuits are monitored with the plurality of voltage level monitoring circuits and the plurality of current monitoring circuits to determine threshold voltage and current levels for the lighting circuits, the switch also adapted to activate a pre-trip inspection mode wherein said lighting circuits are sequentially activated to allow a user to inspect corresponding lighting units; a microcontroller coupled to the circuit board for storing the threshold voltage and current levels and the temperature sensed by the temperature sensor, said microcontroller being adapted to calculate an adjusted threshold current based on a voltage sensitivity and the sensed temperature; and a fault indicator for indicating a status of the light failure detection system is a measured current is above or below the adjusted threshold current by a predetermined value.

2. The light failure detection system with pre-trip inspection of claim 1, further comprising a transceiver coupled to the circuit board for sending information to a master control unit.

3. The light failure detection system with pre-trip inspection of claim 2, further comprising a mechanical enclosure for housing the circuit board, learn mode switch, and fault indicator.

4. The light failure detection system with pre-trip inspection of claim 3, wherein the mechanical enclosure is filled with potting compound.

5. The light failure detection system with pre-trip inspection of claim 1, further including a plurality of wire outputs fed from the plurality of lighting circuits.

6. The light failure detection system with pre-trip inspection of claim 1, further including a voltage regulator for converting an input supply voltage to supply levels required by the light failure detection system.

7. A method of detecting a failure of a light emitting diode lighting device in a vehicle having a failure detection system, said method comprising: activating a pre-trip inspection mode; sequentially activating a plurality of lighting circuits to allow a user to inspect corresponding lighting units; activating a learn mode; measuring a current (C_ref) and a voltage (V_ref) of a plurality of lighting circuits at an input voltage; measuring a system temperature (T_ref); deactivating said learn mode; measuring at least one light drive input current (C_now) and voltage (V_now) in a normal mode; measuring the system temperature in a normal mode; calculating an adjusted threshold current value based on a voltage sensitivity and system temperature; determining if the measured light drive input current is below or above the adjusted threshold current value by a predetermined value; and displaying an indication of light failure if the measured current is below or above the adjusted threshold current value by said predetermined value.

8. The method of detecting a failure of a light emitting diode lighting device of claim 7, said method further comprising wirelessly transmitting information from the failure detection system to a master control unit.

9. The method of detecting a failure of a light emitting diode lighting device in a vehicle having a failure detection system of claim 8, further comprising: measuring a reduced input current (C_low) and voltage (V_low) of the plurality of lighting circuits at a reduced input voltage.

10. The method of detecting a failure of a light emitting diode lighting device in a vehicle having a failure detection system of claim 9, wherein the voltage sensitivity is measured using the formula:

Sensitivity=$(C\_ref-C\_low)/(V\_ref-V\_low)$.

11. The method of detecting a failure of a light emitting diode lighting device in a vehicle having a failure detection system of claim 10, wherein the step of calculating an adjusted threshold current value includes determining a voltage adjusted threshold using the formula:

$V$-adjusted threshold=$C\_ref+((V\_now-V\_ref)*$Sensitivity$)$.

12. The method of detecting a failure of a light emitting diode lighting device in a vehicle having a failure detection system of claim 9, wherein the step of calculating an adjusted threshold current value further includes adjusting the voltage adjusted threshold using the formula:

$T$-adjusted threshold=$V$-adjusted threshold$*(1+(T\_const*(T\_now-T\_ref)))$; and wherein $T\_const$ is 0.002.

13. The method of detecting a failure of a light emitting diode lighting device in a vehicle having a failure detection system of claim 12, further comprising: detecting if any of the lighting circuits share current by measuring the current of single active circuit configurations and then measuring the current for each two-circuit configuration, wherein a shared circuit is detected if the current for a two-circuit configuration is less than the single circuit current by at least 15 mA for both circuits.

14. The method of detecting a failure of a light emitting diode lighting device in a vehicle having a failure detection system of claim 13, wherein the step of determining if the measured light drive input current is below or above the adjusted threshold current value by a predetermined current delta value includes determining if C_now is less than (T-adjusted threshold−lower limit) or if C_now is greater than (T-adjusted threshold+upper limit).

15. The method of detecting a failure of a light emitting diode lighting device in a vehicle having a failure detection system of claim 14, wherein if the lighting circuit is determined to be a single circuit, the upper and lower limit are a predetermined allowed current delta of the lighting circuit, and if the lighting circuit is determined to be a shared circuit, the lower limit is determined by calculating a sum of the active currents (C_now) and the sum of the adjusted C_ref currents for the shared circuits, comparing the C_now and the C_ref, and setting the lower limit to a largest allowed predetermined current delta among the active circuits and setting the upper limit to a predetermined value if the allowed predetermined current deltas among the active circuits are different and set to the allowed predetermined current delta among the active circuits if the allowed predetermined current deltas among the active circuits are the same.

16. A method of detecting a failure of a light emitting diode lighting device in a vehicle having a failure detection system, said method comprising:

activating a pre-trip inspection mode by sequentially activating a plurality of lighting circuits to allow a user to inspect corresponding lighting units, said lighting circuits coupled to a circuit board by one or more input wires;

activating a switch to thereby place said light failure detection system into a learn mode;

measuring a current (C_ref) via a one or more current monitoring circuits and a voltage (V_ref) via one or more voltage monitoring circuits of the plurality of lighting circuits at an input voltage;

measuring a system temperature (T_ref) via a temperature sensor;

deactivating said learn mode by use of the;

measuring at least one light drive input current (C_now) and voltage (V_now) in a normal mode;

measuring the system temperature in a normal mode;

a microcontroller calculating an adjusted threshold current value based on a voltage sensitivity and system temperature, wherein said microcontroller stores threshold voltage and current levels and the temperature sensed by the temperature sensor;

determining if the measured light drive input current is below or above the adjusted threshold current value by a predetermined value; and displaying an indication of light failure if the measured current is below or above the adjusted threshold current value by said predetermined value.

17. The method of detecting a light emitting diode lighting device of claim 16, said method further comprising a transceiver wirelessly transmitting information from the failure detection system to a master control unit.

18. The method of detecting a failure of a light emitting diode lighting device in a vehicle having a failure detection system of claim 17, further comprising: measuring a reduced input current (C_low) and voltage (V_low) of the plurality of lighting circuits at a reduced input voltage, wherein the current monitoring circuit measures C low and the voltage monitoring circuit measures V low.

19. The method of detecting a failure of a light emitting diode lighting device in a vehicle having a failure detection system of claim 18, wherein the voltage sensitivity is measured by the microcontroller using the formula:

Sensitivity=$(C\_ref-C\_low)/(V\_ref-V\_low)$.

20. The method of detecting a failure of a light emitting diode lighting device in a vehicle having a failure detection system of claim 19, wherein the microcontroller performs the step of calculating an adjusted threshold current value and includes determining a voltage adjusted threshold using the formula:

$V$-adjusted threshold=$C\_ref+((V\_now-V\_ref)*$Sensitivity$)$.

21. The method of detecting a failure of a light emitting diode lighting device in a vehicle having a failure detection system of claim 18, wherein the microcontroller performs the step of calculating an adjusted threshold current value and further includes adjusting the voltage adjusted threshold using the formula:

$$T\text{-adjusted threshold} = V\text{-adjusted threshold} * (1 + (T\_const * (T\_now - T\_ref))); \text{ and wherein}$$
$$T\_const \text{ is } 0.002.$$

22. The method of detecting a failure of a light emitting diode lighting device in a vehicle having a failure detection system of claim 21, further comprising: detecting if any of the lighting circuits share current by measuring the current of single active circuit configurations and then measuring the current for each two-circuit configuration, wherein a shared circuit is detected if the current for a two-circuit configuration is less than the single circuit current by at least 15 mA for both circuits.

23. The method of detecting a failure of a light emitting diode lighting device in a vehicle having a failure detection system of claim 22, wherein the microcontroller further performs the step of determining if the measured light drive input current is below or above the adjusted threshold current value by a predetermined current delta value includes determining if C_now is less than (T-adjusted threshold−lower limit) or if C_now is greater than (T-adjusted threshold+upper limit).

24. The method of detecting a failure of a light emitting diode lighting device in a vehicle having a failure detection system of claim 23, wherein if the lighting circuit is determined to be a single circuit, the upper and lower limit are a predetermined allowed current delta of the lighting circuit, and if the lighting circuit is determined to be a shared circuit, the lower limit is determined by calculating a sum of the active currents (C_now) and the sum of the adjusted C_ref currents for the shared circuits, comparing the C_now and the C_ref, and setting the lower limit to a largest allowed predetermined current delta among the active circuits and setting the upper limit to a predetermined value if the allowed predetermined current deltas among the active circuits are different and set to the allowed predetermined current delta among the active circuits if the allowed predetermined current deltas among the active circuits are the same.

25. The method of detecting a failure of a light emitting diode lighting device in a vehicle having a failure detection system of claim 23, wherein if the lighting circuit is determined to be a single circuit, the upper and lower limit are a predetermined allowed current delta of the lighting circuit, and if the lighting circuit is determined to be a shared circuit, the lower limit is determined by calculating a sum of the active currents (C_now) and the sum of the adjusted C_ref currents for the shared circuits, comparing the C_now and the C_ref, and setting the lower limit to a largest allowed predetermined current delta among the active circuits and setting the upper limit to a predetermined value if the allowed predetermined current deltas among the active circuits are different and set to the allowed predetermined current delta among the active circuits if the allowed predetermined current deltas among the active circuits are the same.

\* \* \* \* \*